United States Patent
Yamada et al.

(10) Patent No.: US 7,931,099 B2
(45) Date of Patent: Apr. 26, 2011

(54) HYDRAULIC TRAVELING VEHICLE AND CONTROL METHOD FOR HYDRAULIC TRAVELING VEHICLE

(75) Inventors: Takeo Yamada, Komatsu (JP); Jun Koizumi, Hatano (JP)

(73) Assignee: Komatsu Ltd., Tokyo (JP)

( * ) Notice: Subject to any disclaimer, the term of this patent is extended or adjusted under 35 U.S.C. 154(b) by 350 days.

(21) Appl. No.: 12/282,626

(22) PCT Filed: May 7, 2007

(86) PCT No.: PCT/JP2007/059463
§ 371 (c)(1),
(2), (4) Date: Sep. 11, 2008

(87) PCT Pub. No.: WO2007/132691
PCT Pub. Date: Nov. 22, 2007

(65) Prior Publication Data
US 2009/0057040 A1    Mar. 5, 2009

(30) Foreign Application Priority Data
May 15, 2006    (JP) .................................. 2006-135391

(51) Int. Cl.
*B62D 11/04*    (2006.01)
*F15B 11/17*    (2006.01)
(52) U.S. Cl. .......... 180/6.48; 60/420; 180/306; 180/308
(58) Field of Classification Search ................ 180/305, 180/306, 307, 308, 6.48; 60/420, 421, 484
See application file for complete search history.

(56) References Cited

U.S. PATENT DOCUMENTS

| 4,055,046 | A  | * | 10/1977 | Schexnayder | .................. | 60/428 |
| 4,570,441 | A  | * | 2/1986  | Yoshida et al. | ................. | 60/421 |
| 6,148,548 | A  |   | 11/2000 | Tohji |||
| 6,170,261 | B1 |   | 1/2001  | Ishizaki et al. |||
| 6,662,895 | B1 | * | 12/2003 | Bednar | ........................ | 180/308 |
| 2006/0266029 | A1 |   | 11/2006 | Asakage et al. |||
| 2007/0125078 | A1 | * | 6/2007  | Tanaka et al. | .................. | 60/421 |

FOREIGN PATENT DOCUMENTS

| JP | 05-287775 A   | 11/1993 |
| JP | 06-123301 A   | 5/1994  |
| JP | 10-102546 A   | 4/1998  |
| JP | 11-218102 A   | 8/1999  |
| JP | 2000-017693 A | 1/2000  |
| JP | 2005-068845 A | 3/2005  |
| JP | 2006-329248 A | 12/2006 |

* cited by examiner

*Primary Examiner* — Anne Marie M Boehler
(74) *Attorney, Agent, or Firm* — Global IP Counselors

(57) ABSTRACT

With a hydraulic traveling vehicle, a controller is configured and arranged to switch a merging/diverging valve to a merging state when a working equipment is driven with the merging/diverging valve being in a diverging state and with turning of the hydraulic traveling vehicle being carried out, and when a required flow rate parameter for pressurized oil of the working equipment is greater than or equal to a prescribed threshold value, and to maintain the merging/diverging valve in the diverging state when the required flow rate parameter is less than the prescribed threshold value.

5 Claims, 15 Drawing Sheets (a) DETERMINATION OF MRF1, MRR1, MLF1, MLR1

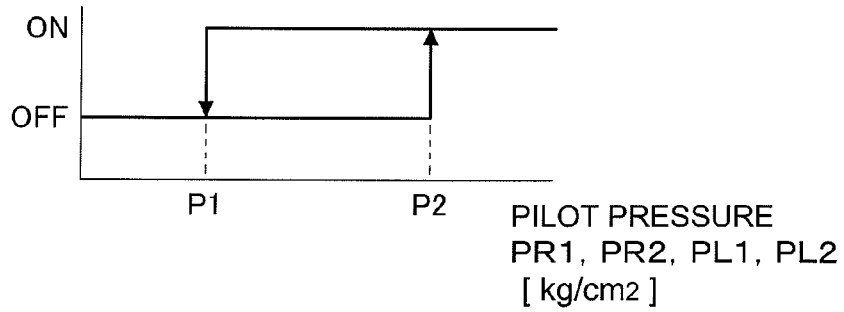

PILOT PRESSURE
PR1, PR2, PL1, PL2
[ kg/cm2 ]

(b) DETERMINATION OF MRF2M MRR2, MLF2, MLR2

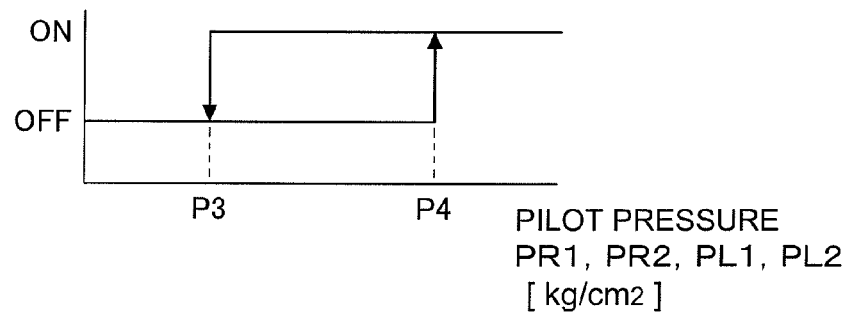

PILOT PRESSURE
PR1, PR2, PL1, PL2
[ kg/cm2 ]

(c) DETERMINATION CONTENTS

|  | PILOT PRESSURE | TRAVEL MOTOR | DRIVE DIRECTION | OUTPUT |
|---|---|---|---|---|
| MRF1 | PR1 | RIGHT | FORWARD | DRIVING |
| MRF2 | PR1 | RIGHT | FORWARD | HIGH |
| MRR1 | PR2 | RIGHT | REVERSE | DRIVING |
| MRR2 | PR2 | RIGHT | REVERSE | HIGH |
| MLF1 | PL1 | LEFT | FORWARD | DRIVING |
| MLF2 | PL1 | LEFT | FORWARD | HIGH |
| MLR1 | PL2 | LEFT | REVERSE | DRIVING |
| MLR2 | PL2 | LEFT | REVERSE | HIGH |

FIG. 3

( TRAVELING DETERMINATION )

(a) RIGHT FORWARD SHARP TURNING DETERMINATION
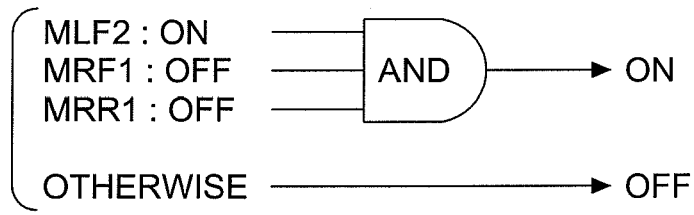
(b) RIGHT REVERSE SHARP TURNING DETERMINATION
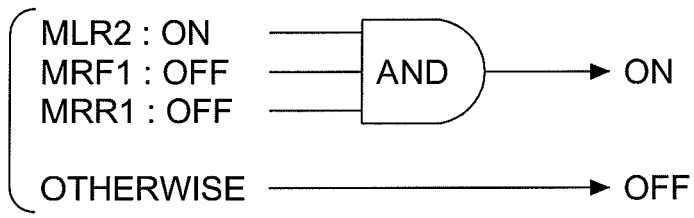
(c) LEFT FORWARD SHARP TURNING DETERMINATION
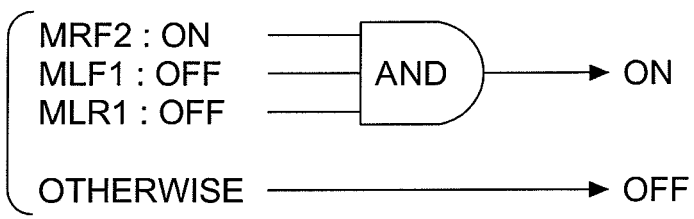
(d) LEFT REVERSE SHARP TURNING DETERMINATION
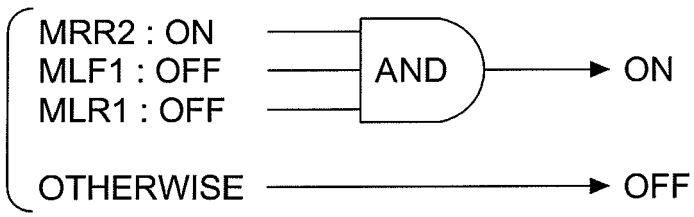
FIG. 5

( SHARP TURNING DETERMINATION )

RIGHT FORWARD SHARP TURNING: ON
RIGHT REVERSE SHARP TURNING: ON
LEFT FORWARD SHARP TURNING: ON
LEFT REVERSE SHARP TURNING: ON
OTHERWISE

→ ON
→ OFF (a) RIGHT FORWARD TURNING, RIGHT REVERSE TURNING, LEFT FORWARD TURNING, LEFT REVERSE TURNING, DETERMINATION
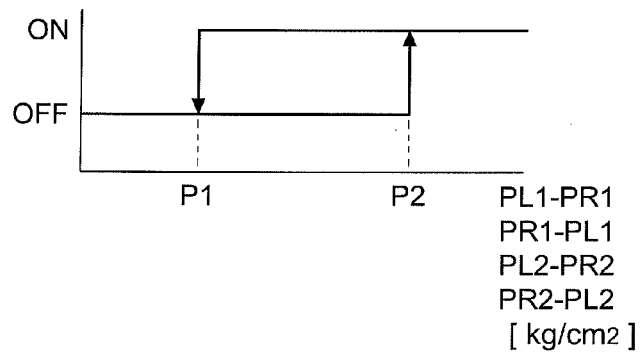
PL1-PR1
PR1-PL1
PL2-PR2
PR2-PL2
[ kg/cm2 ]
(b) TURNING DETERMINATION
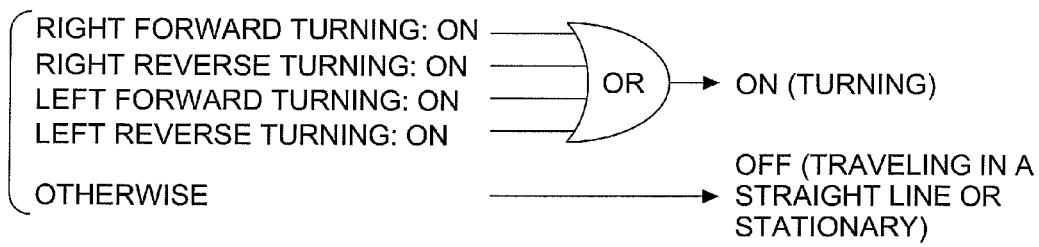
FIG. 7

(a) DETERMINATION OF BDU1, BDD1
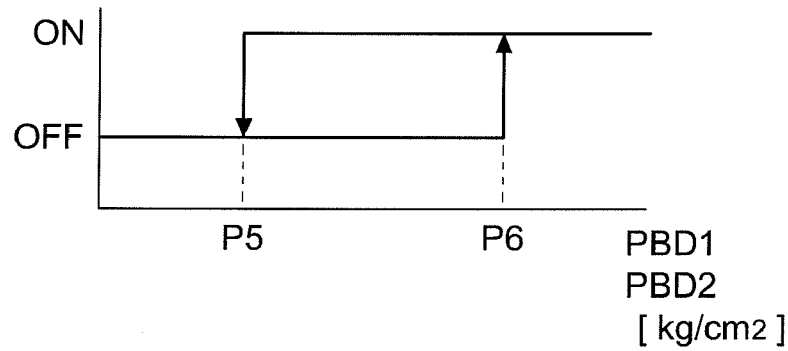
(b) DETERMINATION OF BDU2, BDD2
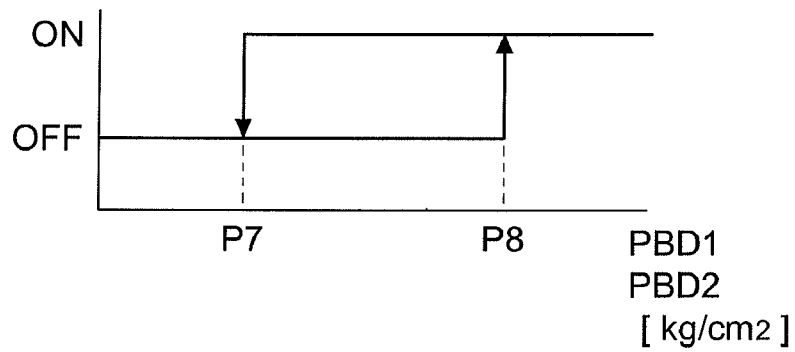
(c) DETERMINATION CONTENTS
|      | PILOT PRESSURE | OPERATION DIRECTION | OUTPUT  |
|------|----------------|---------------------|---------|
| BDU1 | PBD1           | RAISING             | DRIVING |
| BDU2 | PBD1           | RAISING             | HIGH    |
| BDD1 | PBD2           | LOWERING            | DRIVING |
| BDD2 | PBD2           | LOWERING            | HIGH    |
FIG. 8

| NO. | RUNNING STATE | TRAVELING STATE | BLADE | WORKING EQUIPMENT (EXCLUDING BLADE) | MERGING/ DIVERGING VALVE | REMARKS |
|---|---|---|---|---|---|---|
| ① | FIRST RUNNING STATE | STATIONARY | STATIONARY | STATIONARY | MERGING | |
| ② | SECOND RUNNING STATE | STATIONARY | HIGH | STATIONARY | MERGING | |
| ③ | THIRD RUNNING STATE | STATIONARY | LOW | STATIONARY | MERGING | |
| ④ | FOURTH RUNNING STATE | TRAVELING IN A STRAIGHT LINE | STATIONARY | STATIONARY | DIVERGING | |
| ⑤ | FIFTH RUNNING STATE | TRAVELING IN A STRAIGHT LINE | HIGH | STATIONARY | MERGING | |
| ⑥ | SIXTH RUNNING STATE | TRAVELING IN A STRAIGHT LINE | LOW | STATIONARY | MERGING | |
| ⑦ | SEVENTH RUNNING STATE | SHARP TURNING | STATIONARY | STATIONARY | MERGING | |
| ⑧ | EIGHTH RUNNING STATE | SHARP TURNING | DRIVING | STATIONARY | MERGING | |
| ⑨ | NINTH RUNNING STATE | GENTLE TURNING | HIGH | STATIONARY | MERGING | |
| ⑩ | TENTH RUNNING STATE | GENTLE TURNING | STATIONARY | STATIONARY | DIVERGING | NORMAL |
| | | GENTLE TURNING | STATIONARY | STATIONARY | MERGING | WHEN COMING FROM ⑨ |
| ⑪ | ELEVENTH RUNNING STATE | GENTLE TURNING | LOW | STATIONARY | DIVERGING | NORMAL |
| | | GENTLE TURNING | LOW | STATIONARY | MERGING | WHEN COMING FROM ⑥ |
| | | GENTLE TURNING | LOW | STATIONARY | MERGING | WHEN COMING FROM ③ |
| ⑫ | TWELFTH RUNNING STATE | TRAVELING IN A STRAIGHT LINE OR TURNING | STATIONARY OR DRIVING | DRIVING | MERGING | |

FIG. 12

HYDRAULIC TRAVELING VEHICLE AND CONTROL METHOD FOR HYDRAULIC TRAVELING VEHICLE

CROSS-REFERENCE TO RELATED APPLICATIONS

This U.S. national stage application claims priority under 35 U.S.C. §119(a) to Japanese Patent Application No. 2006-135391, filed in Japan on May 15, 2006. The entire disclosure of Japanese Patent Application No. 2006-135391 is hereby incorporated herein by reference.

TECHNICAL FIELD

The present invention relates to a hydraulic traveling vehicle and a method for controlling the hydraulic traveling vehicle.

BACKGROUND ART

Conventional hydraulic traveling vehicles where it is possible to switch between traveling in a straight line, turning, and stopping by controlling hydraulic pressure supplied to a right-travel motor and a left-travel motor are well-known. Hydraulic circuits for two systems, a first hydraulic circuit including a right-travel motor and a second hydraulic circuit including a left-travel motor, are provided at the hydraulic traveling vehicle. A merging/diverging valve for switching each hydraulic circuit between merging and diverging is also provided. With this kind of hydraulic traveling vehicle, working equipment is disposed at the first hydraulic circuit or the second hydraulic circuit. It is then possible to perform prescribed work by controlling the hydraulic pressure supplied to the working equipment. Here, when the working equipment is driven, it is possible to supply a required quantity of pressurized oil to the working equipment by putting the merging/diverging valve in the merging state (refer to Japanese Patent Publication Laid-open No. 6-123301).

SUMMARY OF THE INVENTION

With the hydraulic traveling vehicle explained above, in the event that control is carried out to put the merging/diverging valve in a diverging state with the working equipment not being driven and with turning taking place, when the working equipment is driven during turning the merging/diverging valve is switched over from a diverging state to a merging state. When switching over between merging and diverging takes place during turning, there is the fear that a shock will occur as a result of the drive speeds for the right-travel motor and the left-travel motor changing abruptly. Further, there are also cases where this kind of shock occurs when working equipment is stopped during turning.

The challenge of the present invention is therefore to provide a hydraulic traveling vehicle and a control method for a hydraulic traveling vehicle capable of suppressing shocks when driving and stopping working equipment while turning.

A hydraulic traveling vehicle of a first aspect of the invention comprises a right-travel motor, a left-travel motor, working equipment, a hydraulic pump, a merging/diverging valve, and a control unit. The right-travel motor is arranged in a first hydraulic circuit and is driven by pressurized oil. The left-travel motor is arranged in a second hydraulic circuit and is driven by pressurized oil. The working equipment is arranged in the first hydraulic circuit or the second hydraulic circuit and is driven by pressurized oil. The hydraulic pump includes a first hydraulic oil supply unit configured and arranged to supply the pressurized oil to the first hydraulic circuit and a second hydraulic oil supply unit configured and arranged to supply the pressurized oil to the second hydraulic circuit. The merging/diverging valve is configured and arranged to switch between a merging state to merge the first hydraulic circuit and the second hydraulic circuit and a diverging state to separate the first hydraulic circuit and the second hydraulic circuit. The control unit is configured to switch the merging/diverging valve, when the working equipment is driven, the merging/diverging valve is in the diverging state, and the hydraulic traveling vehicle is traveling in a turning condition, such that the merging/diverging valve is switched to the merging state when a required flow rate parameter corresponding to a required flow rate for the pressurized oil of the working equipment is greater than or equal to a prescribed threshold value, and the merging/diverging valve is maintained in the diverging state when the required flow rate parameter is lower than the prescribed threshold value.

With this hydraulic traveling vehicle, the merging/diverging valve is switched over to the merging state when the working equipment is driven with the merging/diverging valve being in the diverging state and performing turning, and when the required flow rate parameter is greater than or equal to the prescribed threshold value. As a result, it is possible to ensure pressurized oil is supplied to the working equipment, it is possible to suppress falls in rotational speed of travel motors included in the same hydraulic circuit as the working equipment, and it is possible to suppress over-turning and under-turning. The merging/diverging valve is maintained in the diverging state when the required flow rate parameter is lower than the prescribed threshold value. As a result, the frequency of switching over from the diverging state to the merging state during turning is reduced, and the occurrence of shocks when the working equipment is driven during turning is suppressed. Further, in this event, the required flow rate for pressurized oil for the working equipment is low. There is therefore no fear of supply of pressurized oil to the working equipment being insufficient or of the rotational speed of travel motors included in the same hydraulic circuit as the working equipment falling.

With the hydraulic traveling vehicle of a second aspect of the invention, in the hydraulic traveling vehicle of the first aspect of the invention, the control unit is configured to control the merging/diverging valve to be maintained in the merging state regardless of the required flow rate parameter when the hydraulic traveling vehicle is switched turnfrom a straight line traveling condition to the turning condition with the working equipment being driven and the merging/diverging valve being in the merging state.

This means that, effectively, a state is adopted where working equipment is driven during turning when switching over from traveling in a straight line to turning with the working equipment being driven, and with the merging/diverging valve in the merging state. However, in this case, the merging/diverging valve is originally in the merging state. It is therefore possible to suppress the occurrence of shocks due to switching over between merging and diverging by maintaining the merging state regardless of the required flow rate parameter.

With the hydraulic traveling vehicle of a third aspect of the invention, in the hydraulic traveling vehicle of the first aspect of the invention, the control unit is further configured to control the merging/diverging valve to be maintained in the merging state regardless of the required flow rate parameter when the turnhydraulic traveling vehicle is switched from a stationary state to the turning condition with the working equipment being driven and the merging/diverging valve being in the merging state.

This means that, effectively, a state is adopted where working equipment is driven during turning when switching over from a stationary state to turning with the working equipment being driven, and with the merging/diverging valve in the merging state. However, in this case, the merging/diverging valve is originally in the merging state. It is therefore possible to suppress the occurrence of shocks due to switching over between merging and diverging by maintaining the merging state regardless of the required flow rate parameter.

In a hydraulic traveling vehicle of a fourth aspect of the invention, with the hydraulic traveling vehicle of any one of the first to third aspects of the invention, there is further provided a working equipment valve configured and arranged to regulate the pressurized oil supplied to the working equipment, a working equipment operation unit configured and arranged to regulate pilot pressure supplied to the working equipment valve according to an operation amount of the working equipment, and a pilot pressure detector configured and arranged to detect the pilot pressure supplied to the working equipment valve. Here, the control unit is configured to compare the pilot pressure detected by the pilot pressure detector as the required flow rate parameter with the prescribed threshold value.

With this hydraulic traveling vehicle, determination of switching of the merging/diverging valve is carried out based on the pilot pressure supplied to the working equipment valve. The pilot pressure supplied to the working equipment valve is corresponding to the required flow rate for the pressurized oil of the working equipment. It is therefore possible to achieve a more accurate determination of switching of the merging/diverging valve.

A hydraulic traveling vehicle of a fifth aspect of the invention comprises a right-travel motor, a left-travel motor, working equipment, a hydraulic pump, a merging/diverging valve, and a control unit. The right-travel motor is arranged in a first hydraulic circuit and is driven by pressurized oil. The left-travel motor is arranged in a second hydraulic circuit and is driven by pressurized oil. The working equipment is arranged in the first hydraulic circuit or the second hydraulic circuit and is driven by pressurized oil. The hydraulic pump includes a first hydraulic oil supply unit configured and arranged to supply the pressurized oil to the first hydraulic circuit and a second hydraulic oil supply unit configured and arranged to supply the pressurized oil to the second hydraulic circuit. The merging/diverging valve is configured and arranged to switch between a merging state to merge the first hydraulic circuit and the second hydraulic circuit and a diverging state to separate the first hydraulic circuit and the second hydraulic circuit. The control unit is configured to control the merging/diverging valve when the working equipment is stopped from a state where the hydraulic traveling vehicle is in turn a turning condition, the working equipment is being driven, and the merging/diverging valve is in the merging state, such that the merging/diverging valve is maintained in the merging state while the hydraulic traveling vehicle is maintained in the turning condition, and the merging/diverging valve is switched to the diverging state when the hydraulic traveling vehicle is switched from the turning condition to a straight line traveling condition.

The hydraulic traveling vehicle maintains the merging/diverging valve in the merging state until traveling in a straight line is changed over to from turning when working equipment is stopped from the state where the merging/diverging valve is in the merging state with turning taking place and with the working equipment being driven. As a result, it is possible to prevent shocks from occurring when the working equipment is stopped during turning.

A method is provided for controlling a hydraulic traveling vehicle of a sixth aspect of the invention having a right-travel motor arranged in a first hydraulic circuit to be driven by pressurized oil, a left-travel motor arranged in a second hydraulic circuit to be driven by pressurized oil, a working equipment arranged in the first hydraulic circuit or the second hydraulic circuit to be driven by pressurized oil, a hydraulic pump with a first hydraulic oil supply unit configured and arranged to supply the pressurized oil to the first hydraulic circuit and a second hydraulic oil supply unit configured and arranged to supply the pressurized oil to the second hydraulic circuit, and a merging/diverging valve configured and arranged to switch between a merging state to merge the first hydraulic circuit and the second hydraulic circuit and a diverging state to separate the first hydraulic circuit and the second hydraulic circuit. The method includes: detecting a required flow rate parameter corresponding to a required flow rate of the pressurized oil of the working equipment; determining whether the required flow rate parameter is greater than or equal to a prescribed threshold value when driving of the working equipment starts from a state where the hydraulic traveling vehicle is traveling in a turning condition, the working equipment is not being driven, and the merging/diverging valve is in the diverging state; switching the merging/diverging valve to the merging state when the required flow rate parameter is equal to or greater than the prescribed threshold value; and maintaining the merging/diverging valve in the diverging state when the required flow rate parameter is less than the prescribed threshold value.

In this method for controlling the hydraulic traveling vehicle, the merging/diverging valve is switched over to the merging state when driving the working equipment in a state where the merging/diverging valve is in the diverging state and turning is taking place, and when the required flow rate parameter is greater than or equal to the prescribed threshold value. As a result, it is possible to ensure pressurized oil is supplied to the working equipment, it is possible to suppress falls in rotational speed of travel motors included in the same hydraulic circuit as the working equipment, and it is possible to suppress under-turning and over-turning. The merging/diverging valve is maintained in the diverging state when the required flow rate parameter is lower than the prescribed threshold value. As a result, the frequency of switching over from the diverging state to the merging state during turning is reduced, and the occurrence of shocks when the working equipment is driven during turning is suppressed. Further, in this event, the required flow rate for pressurized oil for the working equipment is low. There is therefore no fear of supply of pressurized oil to the working equipment being insufficient or of the rotational speed of travel motors included in the same hydraulic circuit as the working equipment falling.

A method is provided for controlling a hydraulic traveling vehicle of a seventh aspect of the invention having a right-travel motor arranged in a first hydraulic circuit to be driven by pressurized oil, a left-travel motor arranged in a second hydraulic circuit to be driven by pressurized oil, a working equipment arranged in the first hydraulic circuit or the second hydraulic circuit to be driven by pressurized oil, a hydraulic pump with a first hydraulic oil supply unit configured and arranged to supply the pressurized oil to the first hydraulic circuit and a second hydraulic oil supply unit configured and arranged to supply the pressurized oil to the second hydraulic circuit, and a merging/diverging valve configured and arranged to switch between a merging state to merge the first hydraulic circuit and the second hydraulic circuit and a diverging state to separate the first hydraulic circuit and the second hydraulic circuit. The method includes: determining whether the turning condition of the hydraulic traveling vehicle is being maintained or the hydraulic traveling vehicle is switched from the turning condition to a straight line traveling condition turn when the working equipment is stopped from a state where the hydraulic traveling vehicle is traveling in the turning condition, the working equipment is being driven, and the merging/diverging valve is in the merging state; maintaining the merging/diverging valve in the merging state upon determining that the turning condition is being maintained; switching the merging/diverging valve to the diverging state upon determining that the hydraulic traveling vehicle is switched from the turning condition to the straight line traveling condition turn.

In this method for controlling a hydraulic traveling vehicle, the merging/diverging valve is maintained in the merging state until switching over to traveling in a straight line from turning when the working equipment is stopped from a state where turning is taking place, the working equipment is being driven, and the merging/diverging valve is in the merging state. As a result, it is possible to suppress shocks from occurring when the working equipment is stopped during turning.

BRIEF DESCRIPTION OF THE DRAWINGS

FIG. 3 is a view showing logic for determining a drive state of a travel motor;
FIG. 5 is a view showing logic for determining a sharp turning determination;
FIG. 7 is a view showing logic for determining a turning determination;
FIG. 8 is a view showing logic for determining a blade operation state;
FIG. 12 is a table showing merging/diverging valve states every running state.

DETAILED DESCRIPTION OF THE INVENTION

Overall Structure

Figure 1:
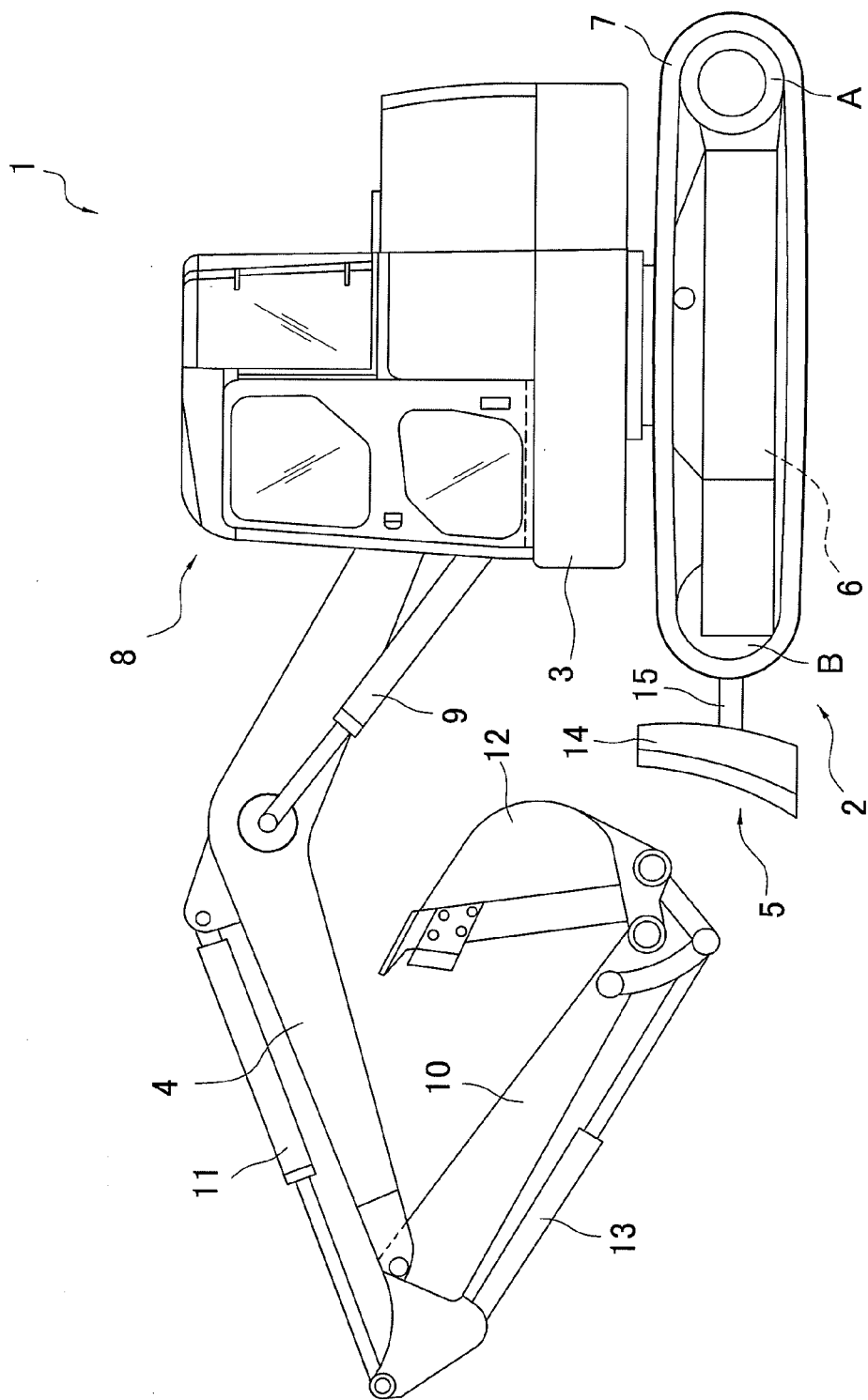
FIG. 1 is a side view of a hydraulic traveling vehicle.

A hydraulic traveling vehicle 1 of an embodiment of the present invention is shown in FIG. 1. The hydraulic traveling vehicle 1 is a hydraulic shovel and includes a base travel unit 2, an upper revolving unit 3, and working equipment such as a boom 4 and a blade 5.

The base travel unit 2 has drive wheels A and idler wheels B fitted to either end of a vehicle frame 6. Crawler tracks 7 are then wrapped around the drive wheels A and the idler wheels B. The crawler tracks 7 are then rotatably driven as a result of rotation of the drive wheels A by travel motors 18, 19 and traveling takes place.

The upper revolving unit 3 is mounted on the base travel unit 2 and can freely turn with respect to the base travel unit 2. The engine (not shown), drive system equipment such as the hydraulic pump, and a cab 8 (operators seat) are provided at the upper revolving unit 3.

The boom 4 is provided at the upper revolving unit 3 and is driven by a boom cylinder 9. A base end of the boom 4 is fitted to the upper revolving unit 3 and an arm 10 is fitted to an end of the boom 4. The arm 10 is driven by an arm cylinder 11. A bucket 12 is fitted to an end of the arm 10 and is driven by a bucket cylinder 13.

The blade 5 is working equipment for carrying out land leveling work etc. and is fitted to the base travel unit 2. The blade 5 has a blade body 14, a fitting frame 15 for fitting the blade body 14 to the base travel unit 2, and a blade cylinder 16 for driving the blade body 14 (refer to FIG. 2). The blade body 14 is supported in a rotatable manner by the fitting frame 15 and is rotatable in a vertical direction by the blade cylinder 16, taking a base end of the fitting frame 15 as a fulcrum.

Structure of Hydraulic Circuits

Figure 2:
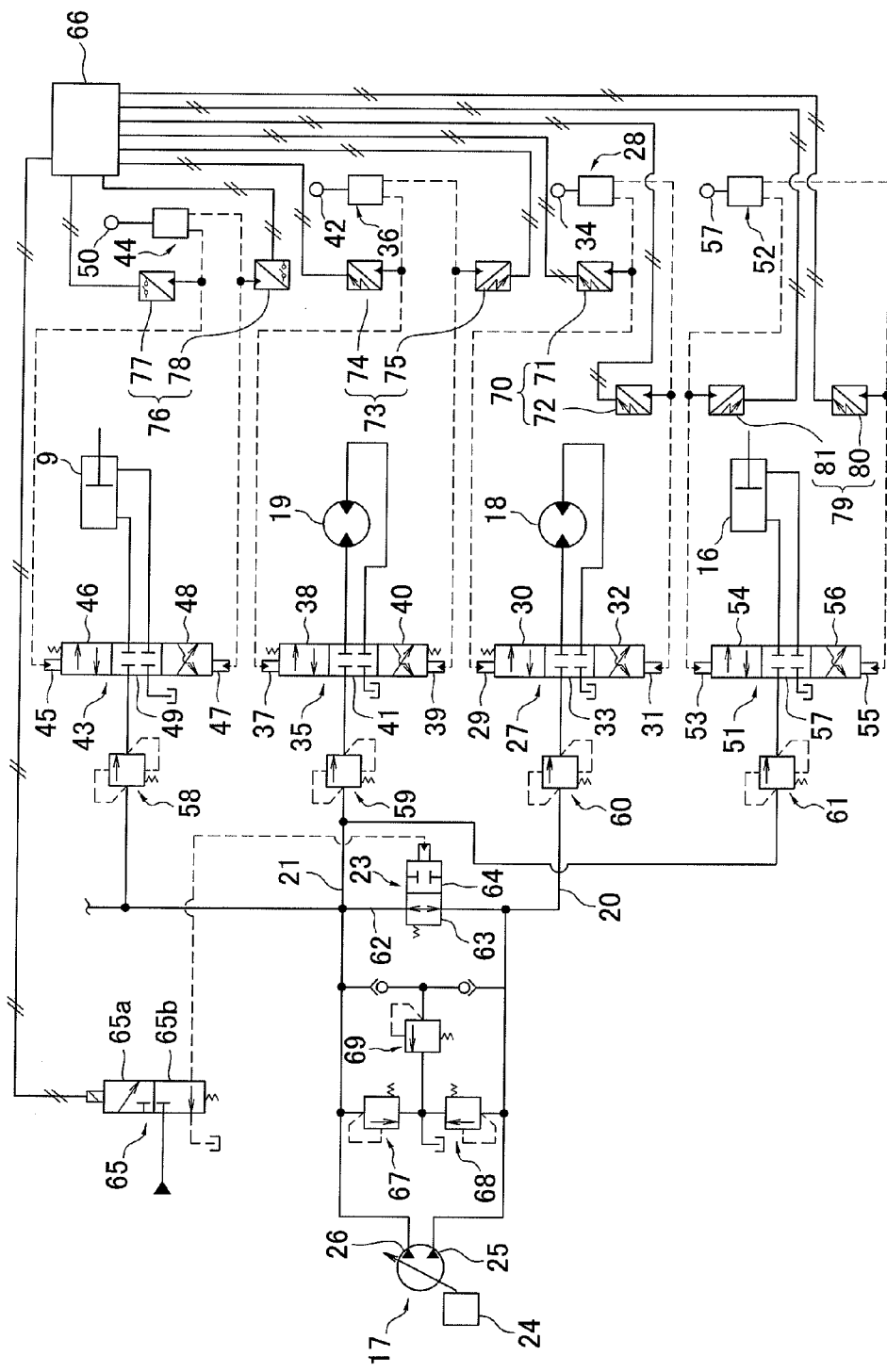
FIG. 2 is a hydraulic circuit diagram.

A structure for the hydraulic circuits the hydraulic traveling vehicle 1 is equipped with is shown in FIG. 2. The hydraulic circuits enable traveling of the hydraulic traveling vehicle 1 and operations such as land leveling and excavation by supplying pressurized oil discharged from a hydraulic pump 17 to hydraulic actuators such as the right-travel motor 18, the left-travel motor 19, the boom cylinder 9, and the blade cylinder 16. This hydraulic circuit has two circuit systems of a first hydraulic circuit 20 including the right-travel motor 18 and a second hydraulic circuit 21 including the left-travel motor 19, the boom cylinder 9, and the blade cylinder 16. Merging and diverging (separating) of the first hydraulic circuit 20 and the second hydraulic circuit 21 can then be achieved by opening and closing a merging/diverging valve 23.

Hydraulic Pump 17

The hydraulic pump 17 is a variable capacity pump taking the engine as a drive source that is capable of controlling the extent of discharge of pressurized oil by controlling a tilt angle using a regulator 24. The hydraulic pump 17 has a first pressurized oil supply opening 25 that supplies pressurized oil to the first hydraulic circuit 20 and a second pressurized oil supply opening 26 that supplies pressurized oil to the second hydraulic circuit 21 and is a double-pump capable of supplying pressurized oil to two different types of hydraulic circuit from a single pump body.

Right-Travel Motor 18 and Left-Travel Motor 19

The right-travel motor 18 and the left-travel motor 19 are hydraulic motors driven by pressurized oil. The right-travel motor 18 drives the crawler track 7 disposed on the right side of the vehicle frame 6, and the left-travel motor 19 drives the crawler track 7 disposed on the left side of the vehicle frame 6. Here, "left" and "right" refers to left and right directions as viewed by the operator within the cab 8.

A flow direction and flow rate of pressurized oil supplied to the right-travel motor 18 can be adjusted using a right-travel valve 27. The right-travel valve 27 is a direction control valve that regulates the flow direction and flow rate of pressurized oil supplied to the right-travel motor 18 according to the pilot pressure received from the right-travel pilot valve 28. The right-travel valve 27 switches over to a first state 30 when a prescribed pilot pressure acts on a first pilot chamber 29, and switches over to a second state 32 when a prescribed pilot pressure acts on a second chamber 31. The first state is a state where pressurized oil is supplied to the right-travel motor 18 in a forward-driving direction. The second state is a state where pressurized oil is supplied to the right-travel motor 18 in a reverse-driving direction. When the pilot pressure does not act on the right-travel valve 27, a neutral state 33 is adopted where pressurized oil is not supplied to the right-travel motor 18. The right-travel pilot valve 28 has a right-travel lever 34 disposed in the cab 8 and is a PPC valve (Pressure Proportional Control valve) that regulates the pilot pressure supplied to the right-travel valve 27 according to an extent of operation (operation amount) of the right-travel lever 34.

A flow direction and flow rate of pressurized oil supplied to the left-travel motor 19 can be adjusted using a left-travel valve 35. The left-travel valve 35 is a direction control valve that regulates the flow direction and flow rate of pressurized oil supplied to the left-travel motor 19 according to the pilot pressure received from the left-travel pilot valve 36. The left-travel valve 35 switches to a first state 38 when a prescribed pilot pressure acts on a first pilot chamber 37, and switches to a second state 40 when a prescribed pilot pressure acts on a second pilot chamber 39. The first state 38 is a state where pressurized oil is supplied to the left-travel motor 19 in a forward-driving direction. The second state 40 is a state where pressurized oil is supplied to the left-travel motor 19 in a reverse-driving direction. When the pilot pressure does not act on the left-travel valve 35, a neutral state 41 where pressurized oil is not supplied to the left-travel motor 19 is adopted. The left-travel pilot valve 36 has a left-travel lever 42 disposed at the cab 8 and is a PPC valve that regulates the pilot pressure supplied to the left-travel valve 35 according to an extent of operation of the left-travel lever 42.

The right-travel motor 18 and the right-travel valve 27 are included in the first hydraulic circuit 20, and the left-travel motor 19 and the left-travel valve 35 are included in the second hydraulic circuit 21.

Boom Cylinder 9 and Blade Cylinder 16

The boom cylinder 9 and the blade cylinder 16 are hydraulic cylinders driven by pressurized oil. The blade 5 is lifted up when the blade cylinder 16 is contracted and is lowered when the blade cylinder 16 is elongated. Further, the boom 4 is raised when the boom cylinder 9 is elongated, and is lowered when the boom cylinder 9 is contracted.

A flow direction and flow rate of pressurized oil supplied to the boom cylinder 9 can be regulated using a boom valve 43. The boom valve 43 is a direction control valve that regulates the flow direction and flow rate of pressurized oil supplied to the boom cylinder 9 according to the pilot pressure received from a boom pilot valve 44. The boom valve 43 switches over to a first state 46 when a prescribed pilot pressure acts on a first pilot chamber 45, and switches over to a second state 48 when a prescribed pilot pressure acts on a second pilot chamber 47. The first state 46 is a state where pressurized oil is supplied in a direction that causes the boom cylinder 9 to elongate. The second state 48 is a state where pressurized oil is supplied in a direction that causes the boom cylinder 9 to contract. A neutral state 49 where pressurized oil is not supplied to the boom cylinder 9 is adopted when the pilot pressure does not act on the boom valve 43. The boom pilot valve 44 has a boom operation lever 50 disposed at the cab 8 and is a PPC valve that regulates the pilot pressure supplied to the boom valve 43 according to an extent of operation (operation amount) of the boom operation lever 50.

A flow direction and flow rate for pressurized oil supplied to the blade cylinder 16 can be adjusted using a blade valve 51. The blade valve 51 regulates the flow direction and flow rate of pressurized oil supplied to the blade cylinder 16 according to the pilot pressure received from a blade pilot valve 52. The blade valve 51 switches over to a first state 54 when a prescribed pilot pressure acts on a first pilot chamber 53 and switches over to a second state 56 when a prescribed pilot pressure acts on a second pilot chamber 55. The first state 54 is a state where pressurized oil is supplied in a direction causing elongation of the blade cylinder 16. The second state 56 is a state where pressurized oil is supplied in a direction causing contraction of the blade cylinder 16. A neutral state 57 where pressurized oil is not supplied to the blade cylinder 16 is adopted when the pilot pressure does not act on the blade valve 51. The blade pilot valve 52 has a blade operation lever 57 disposed at the cab 8 and is a PPC valve that regulates the pilot pressure supplied to the blade valve 51 according to an extent of operation of the blade operation lever 57.

The boom cylinder 9 and the boom valve 43 are included in the second hydraulic circuit 21 and are provided in parallel with respect to the left-travel motor 19 and the left-travel valve 35. The blade cylinder 16 and the blade valve 51 are also included in the second hydraulic circuit 21 and are provided in parallel with respect to the left-travel motor 19 and the left-travel valve 35.

Flow control valves 60, 59, 58, 61 are provided upstream of the right-travel valve 27, the left-travel valve 35, the boom valve 43, and the blade valve 51.

Merging/Diverging Valve 23

The merging/dividing valve 23 is provided at a merging path 62 linking the first hydraulic circuit 20 and the second hydraulic circuit 21. The merging/diverging valve 23 is capable of switching between merging and diverging of the first hydraulic circuit 20 and the second hydraulic circuit 21 by switching between a merging state 63 allowing passage through the merging path 62 and a diverging state 64 that blocks the merging path 62. The merging/diverging valve 23 is connected to a merging/diverging pilot valve 65 and switches between the merging state 63 and the diverging state 64 according to the pilot pressure received from the merging/diverging pilot valve 65. The merging/diverging valve 23 is urged to the side of the merging state 63 by an urging member such as a spring and is switched over to the diverging state 64 as a result of pilot pressure supplied by the merging/diverging pilot valve 65. The merging/diverging pilot valve 65 is a solenoid valve controlled by a control signal from a controller 66 (described later). The merging/diverging pilot valve 65 is capable of switching over between a communicating state 65a of supplying pilot pressure to the merging/diverging valve 23 and a blocking state 65b where pilot pressure is not supplied to the merging/diverging valve 23. The merging/diverging pilot valve 65 is urged to the side of the blocking state 65b by an urging member such as a spring and is switched over to the communicating state 65a by magnetic excitation.

Unloading valves 67, 68 and a relief valve 69 are provided upstream of the merging path 62.

Pilot Pressure Detectors

Pilot pressure detectors 70, 73, 76, and 79 that detect pilot pressure from the pilot valves 28, 36, 44, and 52 are provided every pilot valve 28, 36, 44 and 52 in the hydraulic circuit.

A right-pressure detector 70 has a first right-pressure sensor 71 and a second right-pressure sensor 72 and detects pilot pressure provided from the right-travel pilot valve 28 to the right-travel valve 27. The first right-pressure sensor 71 detects pilot pressure provided to the first pilot chamber 29 of the right-travel valve 27. The second right-pressure sensor 72 detects pilot pressure supplied to the second pilot chamber 31 of the right-travel valve 27.

A left-pressure detector 73 has a first left-pressure sensor 74 and a second left-pressure sensor 75 and detects pilot pressure provided from the left-travel pilot valve 36 to the left-travel valve 35. The first left-pressure sensor 74 detects pilot pressure provided to the first pilot chamber 37 of the left-travel valve 35. The second left-pressure sensor 75 detects pilot pressure provided to the second pilot chamber 39 of the left-travel valve 35.

A boom pressure detector 76 has a first boom pressure switch 77 and a second boom pressure switch 78 and detects pilot pressure provided from a boom pilot valve 44 to the boom valve 43. The first boom pressure switch 77 detects the pilot pressure in the event that a prescribed pilot pressure is supplied to the first pilot chamber 45 of the boom valve 43. The second boom pressure switch 78 detects the pilot pressure in the event that a prescribed pilot pressure is supplied to the second pilot chamber 47 of the boom valve 43.

A blade pressure detector 79 has a first blade pressure sensor 80 and a second blade pressure sensor 81 and detects pilot pressure supplied from a blade pilot valve 52 to the blade valve 51. The first blade pressure sensor 80 detects pilot pressure supplied to the second pilot chamber 55 of the blade valve 51. The second blade pressure sensor 81 detects pilot pressure supplied to the first pilot chamber 53 of the blade valve 51.

Each of the pilot pressure detectors 70, 73, 76 and 79 are communicated to the controller 66 by a communication line and pilot pressure signals indicating detected pilot pressures are sent to the controller 66.

Controller 66

The controller 66 is configured from a microcomputer and a memory etc. and controls the hydraulic traveling vehicle 1 based on various information. The controller 66 receives pilot pressure signals from the pilot pressure detectors 70, 73, 76, and 79. The controller 66 identifies a traveling state and an operation state of the working equipment based on the pilot pressure signals and functions as a travel switching unit that switches over the merging/diverging valve 23 based on the identification results. Namely, the controller 66 is capable of identifying the traveling state and the operation state of the working equipment based on the pilot pressure signals and is capable of appropriately switching over the merging/diverging valve 23 based on the identification results.

Method for Controlling Hydraulic Traveling Vehicle 1

The following is a detailed description of switching control of the merging/diverging valve 23, of the control of the hydraulic traveling vehicle 1 by the controller 66.

Identification of Traveling State

First, a description is given of identifying the traveling state based on the pilot pressure. Traveling in a straight line (straight line traveling condition), sharp turning (turning condition), gentle turning (turning condition), and stationary state exist as the traveling states for the hydraulic traveling vehicle 1. These traveling states can be understood from drive states of the right-travel motor 18 and the left-travel motor 19. Namely, when the right-travel motor 18 and the left-travel motor 19 are driven in the same direction at the same rotational speed, traveling in a straight line takes place. When one of the right-travel motor 18 and the left-travel motor 19 is stopped and the other is driven, sharp turning takes place. Moreover, gentle turning takes place when the right-travel motor 18 and the left-travel motor 19 are driven in the same direction at different rotational speeds. Here, the controller 66 can understand the drive states of the right-travel motor 18 and the left-travel motor 19 from the magnitude of the pilot pressures supplied to the right-travel valve 27 and the left-travel valve 35. The magnitude of the pilot pressure supplied to the right-travel valve 27 and the left-travel valve 35 corresponds to the flow rate requested for the pressurized oil for the right-travel motor 18 and the left-travel motor 19. The flow rate requested for the pressurized oil corresponds to an extent of driving the right-travel motor 18 and the left-travel motor 19, i.e. the rotational speed of the right-travel motor 18 and the left-travel motor 19.

Understanding Drive States of Travel Motors

Understanding of the drive states of the travel motors 18, 19 based on the pilot pressures can be specifically carried out as follows. Specifically, as shown in FIG. 3, it is determined whether or not a pilot pressure PR1 detected by the first right-pressure sensor 71, a pilot pressure PR2 detected by the second right-pressure sensor 72, a pilot pressure PL1 detected by the first left-pressure sensor 74, and a pilot pressure PL2 detected by the second left-pressure sensor 75 have reached prescribed threshold values P1 to P4.

As shown in FIG. 3(a), when the pilot pressure PR1 is the threshold value P2 or more, MRF1 is changed from "OFF" to "ON". MRF1 indicates determination results for whether or not the right-travel motor 18 is being driven in a forward direction. Namely, an MRF1 of "ON" indicates a state where the right-travel motor 18 is driven in a forward direction. An MRF1 of "OFF" indicates a state where the right-travel motor 18 is not driven in a forward direction. The threshold values are different for when MRF1 changes from "OFF" to "ON" and for when MRF1 changes from "ON" to "OFF". The threshold value for when MRF1 changes from "ON" to "OFF" is P1, where P1<P2.

As shown in FIG. 3(b), when the pilot pressure PR1 is the threshold value P4 or more, MRF2 is changed from "OFF" to "ON". Here, P2<P4, and MRF2 indicates determination results for whether or not the right-travel motor 18 is being driven at high-output in a forward direction. Namely, an MRF2 of "ON" indicates a state where the right-travel motor 18 is driven in a forward direction at high-output. An MRF2 of "OFF" indicates a state where the right-travel motor 18 is not driven at high-output in a forward direction. As with the case for MRF1, threshold values are different for when MRF2 changes from "OFF" to "ON" and for when MRF2 changes from "ON" to "OFF". The threshold value for when MRF2 changes from "ON" to "OFF" is P3, where P3<P4. Further, P1<P2<P3<P4, and when MFR2 is "ON", MRF1 is naturally "ON". MRF1 and MRF2 correspond to the differences in the extent of operation of the right-travel lever 34. Namely, when the right-travel lever 34 is operated in a forward direction i.e. in a directly forward direction as far as a intermediate position (for example, in the order of 20% of completely open), MRF1 is "ON" but MRF2 is "OFF". When the right-travel lever 34 is operated in a forward direction as far as a completely open position, MRF1 and MRF2 are both "ON".

It is then similarly determined whether or not the other pilot pressures PR2, PL1, and PL2 have reached the threshold values P1 to P4 and it is determined whether MRR1, MRR2, MLF1, MLF2, MLR1, or MLR2 are ON or OFF. MRR1 indicates determination results as to whether or not the right-travel motor 18 is being driven in a reverse direction, i.e. a direction to the rear. MLF1 indicates determination results as to whether or not the left-travel motor 19 is being driven in a forward direction. MLR1 indicates determination results as to whether or not the left-travel motor 19 is being driven in a reverse direction. A list showing the determination content of MRF1, MRR1, MLF1, MLR1, MRF2, MRR2, MLF2 and MLR2 collectively is shown in FIG. 3(c). Pilot pressure that can be used in determinations is shown in the column "pilot pressure" of FIG. 3(c). A determination target of either the right-travel motor 18 or the left-travel motor 19 is shown in a travel motor column. Here, "right" is shown as a determination for the right-travel motor 18, and "left" is shown as a determination for the left-travel motor 19.

As shown above, ON/OFF is determined for the MRF1 etc. based on the pilot pressure PR1 etc., and the drive direction for the travel motors 18, 19 and the extent of the output can be understood from the determination results.

Traveling Determination and Sharp Turning Determination

Figure 4:
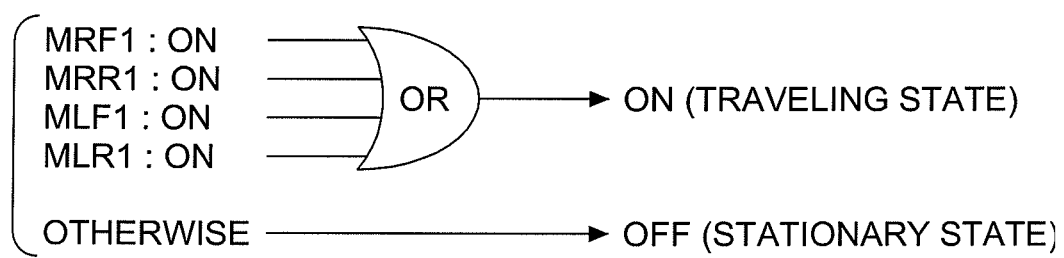
FIG. 4 is a view showing logic for determining a traveling determination.
Figure 6:
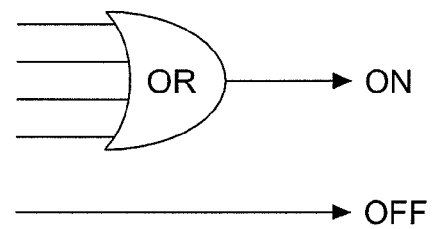
FIG. 6 is a view showing logic for determining a sharp turning determination.

The controller 66 performs traveling determination and sharp turning determination in accordance with determination logic shown in FIG. 4 to FIG. 6 based on the determination results for the drive states of the right-travel motor 18 and the left-travel motor 19.

As shown in FIG. 4, the traveling determination determines whether or not the hydraulic traveling vehicle 1 is traveling or has stopped. A traveling determination of "ON" is determined here if at least one of MRF1, MRR1, MLF1, and MLR1 is "ON". This indicates that at least one of the right-travel motor 18 and the left-travel motor 19 is being driven in a forward direction or a reverse direction, and that the hydraulic traveling vehicle 1 is traveling. In the other case, i.e. if all of MRF1, MRR1, MLF1, MLR1 are "OFF", a traveling determination of "OFF" is determined. In this case, this indicates that neither of the right-travel motor 18 or the left-travel motor 19 are being driven in a forward direction or a reverse direction, and that the hydraulic traveling vehicle 1 has stopped.

In the sharp turning determination, it is determined whether or not the hydraulic traveling vehicle 1 is turning sharply. As shown in FIG. 5, a right forward sharp turning determination, a right reverse sharp turning determination, a left forward sharp turning determination, and a left reverse sharp turning determination are carried out by the controller 66 based on the determination results for the drive states of the right-travel motor 18 and the left-travel motor 19 and the sharp turning determination is carried out based on the determination results.

When MLF2 is "ON" and MRF1 and MRLR1 are both "OFF", a right forward sharp turning determination of "ON" is determined, and in other cases "OFF" is determined. When there is a right forward sharp turning determination of "ON", the left-travel motor 19 is being driven in a forward direction at high output and the right-travel motor 18 is not being driven. A state where sharp turning is taking place while advancing forwards to the right is therefore indicated. The right reverse sharp turning determination, the left forward sharp turning determination, and the left reverse sharp turning determination are then carried out in the similar way as for the right forward sharp turning determination. A right reverse sharp turning determination of "ON" indicates a state where the left-travel motor 19 is driven at high output in a reverse direction and the right-travel motor 18 is not driven so as to give sharp turning while reversing to the rear to the right. A left forward sharp turning determination of "ON" indicates a state where the right-travel motor 18 is being driven at high-output in a forward direction and the left-travel motor 19 is not being driven so as to give sharp turning while advancing forwards to the left. A left reverse sharp turning determination of "ON" indicates that the right-travel motor 18 is being driven in reverse at high-output and the left-travel motor 19 is not being driven so as to give sharp turning while reversing rearwards to the left.

As shown in FIG. 6, the sharp turning determination is carried out from the results of these determinations. The sharp turning determination is determined to be "ON" when any of the right forward sharp turning determination, the right reverse sharp turning determination, the left forward sharp turning determination, or the left reverse sharp turning determination are "ON". In other cases, the sharp turning determination is determined to be "OFF". An sharp turning determination of "ON" indicates that sharp turning is taking place, and a sharp turning determination of "OFF" indicates that sharp turning is not taking place.

Turning Determination

As shown in FIG. 7, the controller 66 carries out a turning determination to determine whether or not the hydraulic traveling vehicle 1 is turning. First, as shown in FIG. 7(a), the controller 66 performs a right forward turning determination, a right reverse turning determination, a left forward turning determination, and a left reverse turning determination. The controller 66 then carries out the turning determination shown in FIG. 7(b) based on the determination results.

In the right forward turning determination, the right reverse turning determination, the left forward turning determination and the left reverse turning determination, a difference in pilot pressures detected by the first left pressure sensor 74 and the first right-pressure sensor 71 and a difference in pilot pressures detected by the second left pressure sensor 75 and the second right-pressure sensor 72 are detected. Whether the turning determination is ON or OFF is then determined using whether or not the differences in the pilot pressures have reached prescribed threshold values. Specifically, as shown in FIG. 7(a), PL1-PR1, PR1-PL1, PL2-PR2, and PR2-PL2 are calculated and it is determined whether or not the differences have reached prescribed threshold values P1, P2. For example, when PL1-PR1 is greater than or equal to the threshold value P2 with the right forward turning determination "OFF", the right forward turning determination is changed to "ON". Further, when PL1-PR1 is less than or equal to the threshold value P1 with the right forward turning determination "ON", the right forward turning determination is changed to "OFF". A right forward turning determination of "ON" indicates a state where the left-travel motor 19 and the right-travel motor 18 are both driven with the left-travel motor 19 being driven in a forward direction at a faster rotational speed than the right-travel motor 18 so that turning while advancing forwards to the right is taking place. The right reverse turning determination, the left forward turning determination, and the left reverse turning determination also similarly take place in the similar way as for the right forward turning determination. A right reverse determination of "ON" indicates that the left-travel motor 19 is being driven in a reverse direction at a rotational speed faster than that of the right-travel motor 18 so that turning while reversing to the right is taking place. A left forward turning determination of "ON" indicates that the right-travel motor 18 is being driven in a forward direction at a faster rotational speed than the left-travel motor 19 and indicates a state where turning takes place while advancing forwards to the left. A left reverse turning determination of "ON" indicates that the right-travel motor 18 is being driven in a reverse direction at a rotational speed greater than the rotational speed of the left-travel motor 19 so that turning takes place while reversing to the left. The same threshold values P1, P2 can be used as threshold values in the traveling determination or a different threshold value can also be used.

As shown in FIG. 7(b), the turning determination can also be carried out from these determination results. The turning determination is determined to be "ON" when any of the right forward turning determination, the right reverse turning determination, the left forward turning determination, or the left reverse turning determination is "ON", and is determined to be "OFF" in other cases. When the turning determination is "ON", it is indicated that turning is being performed regardless of whether the turning is sharp or gentle. When the turning determination is "OFF", a state where turning is not taking place, i.e. a state where traveling in a straight line or a stationary state is taking place is indicated.

Of the traveling state, traveling in a straight line and gently turning can be determined from the determination results for the traveling determination, the sharp turning determination, and the turning determination. When the traveling determination is "ON" and the turning determination is "OFF", it is shown that the hydraulic traveling vehicle 1 is traveling and is not turning, i.e. is traveling in a straight line. Further, when the traveling determination is "ON", the turning determination is "ON", and the sharp turning determination is "OFF", the hydraulic traveling vehicle 1 is traveling, is not sharply turning, and is turning, i.e. is gently turning.

As shown in the above, the controller 66 identifies whether the traveling state of the hydraulic traveling vehicle 1 is traveling in a straight line, sharp turning, gentle turning, or stationary based on the pilot pressures.

Identification of Operating State of Working Equipment

Next, a description is given of a method for identifying operating states of the working equipment. The controller 66 can identify operating states of the blade 5 and the boom 4 by detecting pilot pressure supplied to the blade cylinder 16 and the boom cylinder 9. This is because the magnitude of the pilot pressure supplied to the blade cylinder 16 and the boom cylinder 9 corresponds to the flow rate required for the pressurized oil supplied to the blade cylinder 16 and the boom cylinder 9 and the flow rate required for the pressurized oil corresponds to the extent of driving of the blade cylinder 16 and the boom cylinder 9.

The determination of the operation conditions for the blade 5 determines whether or not a pilot pressure PBD1 detected by the first blade pressure sensor 80 and a pilot pressure PBD2 detected by the second blade pressure sensor 81 have reached prescribed threshold values P5 to P8.

As shown in FIG. 8(a), when the pilot pressure PBD1 is the threshold value P6 or more, BDU1 is changed from "OFF" to "ON". Further, when the pilot pressure PBD1 is the threshold value P5 or less, BDU1 is changed from "ON" to "OFF". BDU1 indicates determination results as to whether or not the blade 5 is being lifted up. A BDU1 of "ON" indicates that the blade 5 is being lifted up, while a BDU1 of "OFF" indicates that the blade 5 is not being lifted up. Similarly, the going ON and OFF of BDD1 is determined using the pilot pressure PBD2. BDD1 indicates determination results as to whether or not the blade 5 is being lowered.

Further, as shown in FIG. 8(b), when the pilot pressure PBD1 is the threshold value P8 or more, BDU2 is changed from "OFF" to "ON". Further, when the pilot pressure PBD1 is the threshold value P7 or less, BDU2 is changed from "ON" to "OFF". BDU2 indicates determination results as to whether or not the blade 5 is being lifted up using high-power. A BDU2 of "ON" indicates that the blade 5 is being lifted up at high-power, while a BDU2 of "OFF" indicates that the blade 5 is not being lifted up at high-power. Similarly, the going ON and OFF of BDD2 is determined using the pilot pressure PBD2. BDD2 indicates determination results as to whether or not the blade 5 is being lowered at high-output. Here, P5<P6<P7<P8.

The determination contents for BDU1, BDU2, BDD1 and BDD2 explained above are shown collectively in FIG. 8(c). The pilot pressures used in the determinations are shown in the "pilot pressure" column of FIG. 8(c). The operation direction of the blade 5 is shown in the "operation direction" column.

Identification of the operating conditions for the boom 4 can be determined from the presence or absence of detection of the pilot pressures PBM1 and PBM2. The pilot pressure PBM1 is the pilot pressure detected from the first boom pressure switch 77. The pilot pressure PBM2 is the pilot pressure detected from the second boom pressure switch 78. It is indicated that the boom 4 is being driven when either of the pilot pressures PBM1 and PBM2 are detected. In particular, when the pilot pressure PBM1 is detected, it is indicated that the boom 4 is rising. When the pilot pressure PBM2 is detected, it is indicated that the boom 4 is falling. When the neither of the pilot pressures PBM1 and PBM2 are detected, a stopped state where the boom 4 is not being driven is indicated.

The operating conditions for other working equipment (for example, the arm 10 and bucket 12 etc.) with the exception of the blade 5 and the boom 4 can be determined in the similar manner as identifying the operating conditions for the boom 4.

Flowchart for Switching Control of Merging/Diverging Valve 23

Figure 9:
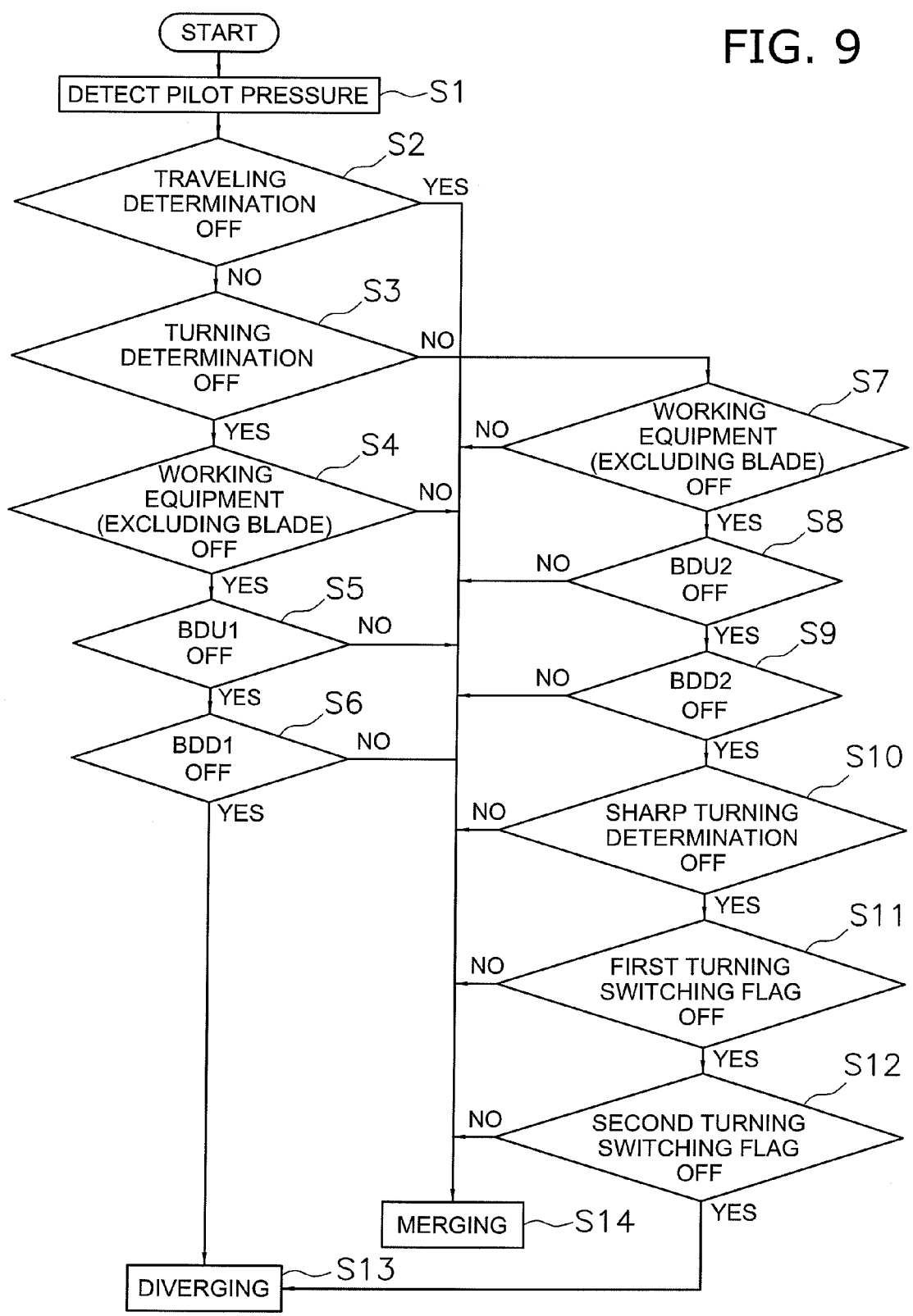
FIG. 9 is a flowchart of switching control for a merging/diverging valve.

The controller 66 identifies the traveling states and the operating states of the working equipment and performs switching control of the merging/diverging valve 23 based on the results. Switching control of the merging/diverging valve 23 is as shown in the flowchart in FIG. 9.

First, in step S1, the pilot pressures PL1, PL2, PR1, PR2, PBD1, PBD2, PBM1, and PBM2 are detected.

In step S2, it is determined whether or not the traveling determination is "OFF". When the traveling determination is "OFF", step S14 is proceeded to, and the merging/diverging valve 23 is put into the merging state 63. When the traveling determination is not "OFF", step S3 is proceeded to.

In step S3, it is determined whether or not the turning determination is "OFF". When the turning determination is "OFF", step S4 is proceeded to. When the turning determination is not "OFF", step S7 is proceeded to.

In step S4, it is determined whether or not the working equipment is stopped with the exception of the blade 5. When the working equipment is stopped with the exception of the blade 5, step S5 is proceeded to. When the working equipment is not stopped with the exception of the blade 5 i.e. when the working equipment is being driven with the exception of the blade 5, step S14 is proceeded to and the merging/diverging valve 23 is put into the merging state 63.

In step S5, it is determined whether or not BDU1 is "OFF". When BDU1 is "OFF", i.e. when an operation of raising the blade 5 is not taking place, step S6 is proceeded to. When BDU1 is not "OFF", i.e. when raising of the blade 5 is being carried out, step S14 is proceeded to and the merging/diverging valve 23 is put into the merging state 63.

In step S6, it is determined whether or not BDD1 is "OFF". When the BDD1 is "OFF", i.e. when the blade 5 is not being lowered, step S13 is proceeded to and the merging/diverging valve 23 is put into the diverging state 64. When BDD1 is not "OFF", i.e. when lowering of the blade 5 is being carried out, step S14 is proceeded to and the merging/diverging valve 23 is put into the merging state 63.

Further, in step S7, it is determined whether or not the working equipment is stopped with the exception of the blade 5. When the working equipment is stopped with the exception of the blade 5, step S8 is proceeded to. When the working equipment is not stopped with the exception of the blade 5 i.e. when the working equipment is being driven with the exception of the blade 5, step S14 is proceeded to and the merging/diverging valve 23 is put into the merging state 63.

In step S8, it is determined whether or not BDU2 is "OFF". When BDU2 is "OFF", i.e. when an operation of raising the blade 5 at high-output is not taking place, step S9 is proceeded to. When BDU2 is not "OFF", i.e. when raising of the blade 5 is being carried out at high output, step S14 is proceeded to and the merging/diverging valve 23 is put into the merging state 63.

In step S9, it is determined whether or not BDD2 is "OFF". When BDU2 is "OFF", i.e. when an operation of lowering the blade 5 at high-output is not taking place, step S10 is proceeded to. When BDD2 is not "OFF", i.e. when lowering of the blade 5 is being carried out at high-output, step S14 is proceeded to and the merging/diverging valve 23 is put into the merging state 63.

In step S10, it is determined whether or not the sharp turning determination is "OFF". When the sharp turning determination is not "OFF", i.e. when sharp turning is taking place, step S14 is proceeded to, and the merging/diverging valve 23 is put into the merging state 63. When the sharp turning determination is "OFF", step S11 is proceeded to. In step S10, it is assumed that the turning determination in step S3 is determined to be "ON". Therefore, when the sharp turning determination is "OFF" in step S10, it is indicated that gentle turning is taking place.

Figure 10:
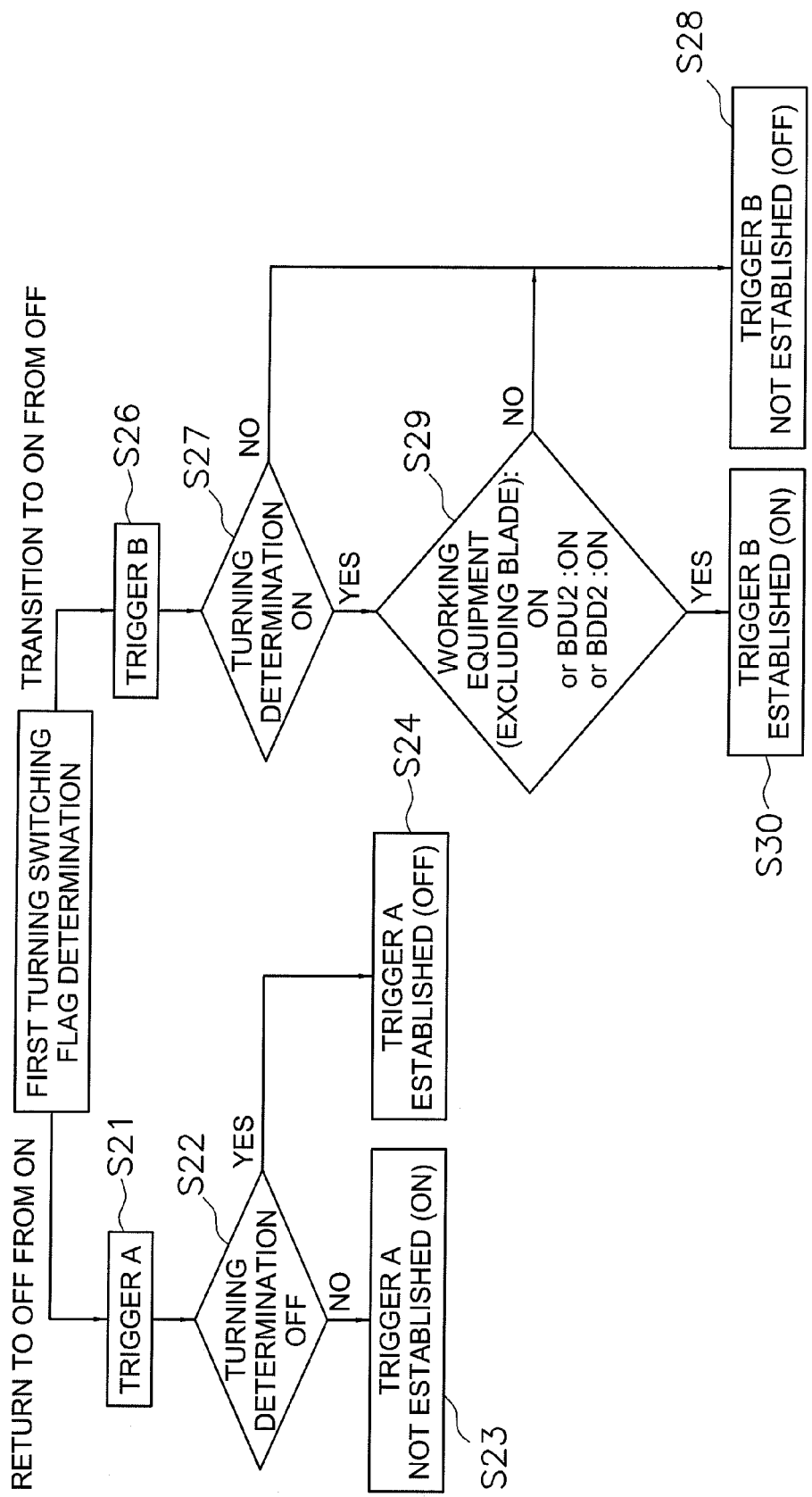
FIG. 10 is a flowchart of switching control for the merging/diverging valve.

In step S11, it is determined whether or not a first turning switching flag is "OFF". The first turning switching flag being ON/OFF is decided according to a flowchart shown in FIG. 10.

When determination whether or not the first turning switching flag has changed from "ON" to "OFF" is performed, determination of a trigger A starting from step S21 is carried out. When determination whether or not the first turning switching flag changes from "OFF" to "ON" is performed, determination of the trigger B starting from step S26 is started.

In the determination to trigger A, in step S22, it is determined whether or not the turning determination is "OFF". When the turning determination is determined not to be "OFF", in step S23, the trigger A is taken to not be established in step S23, and the first turning switching flag remains "ON". When the turning determination is "OFF", the trigger A is established in step S24 and the first turning switching flag is changed to "OFF".

In the determination of trigger B, in step S27, it is determined whether or not the turning determination is "ON". When the turning determination is not "ON", i.e. when the turning determination is "OFF", in step S28, the trigger B is taken to not be established and the first turning switching flag remains "OFF". In step S27, when the turning determination flag is "ON", step S29 is proceeded to. In step S29, it is determined whether or not the working equipment is driven with the exception of the blade 5, whether or not BDU2 is "ON", and whether or not BDD2 is "ON". When one of these three conditions is satisfied, in step S30, the trigger B is taken to be established and the first turning switching flag is put "ON". In step S29, when none of the three conditions are satisfied in step S29, it is taken that the trigger B is not established in step S28 and the first turning switching flag remains "OFF".

Returning to FIG. 9, in step S11, when the first turning switching flag is "OFF", step S12 is proceeded to. When the first turning switching flag is "ON", step S14 is proceeded to and the merging/diverging valve 23 is taken to be in the merging state 63.

Figure 11:
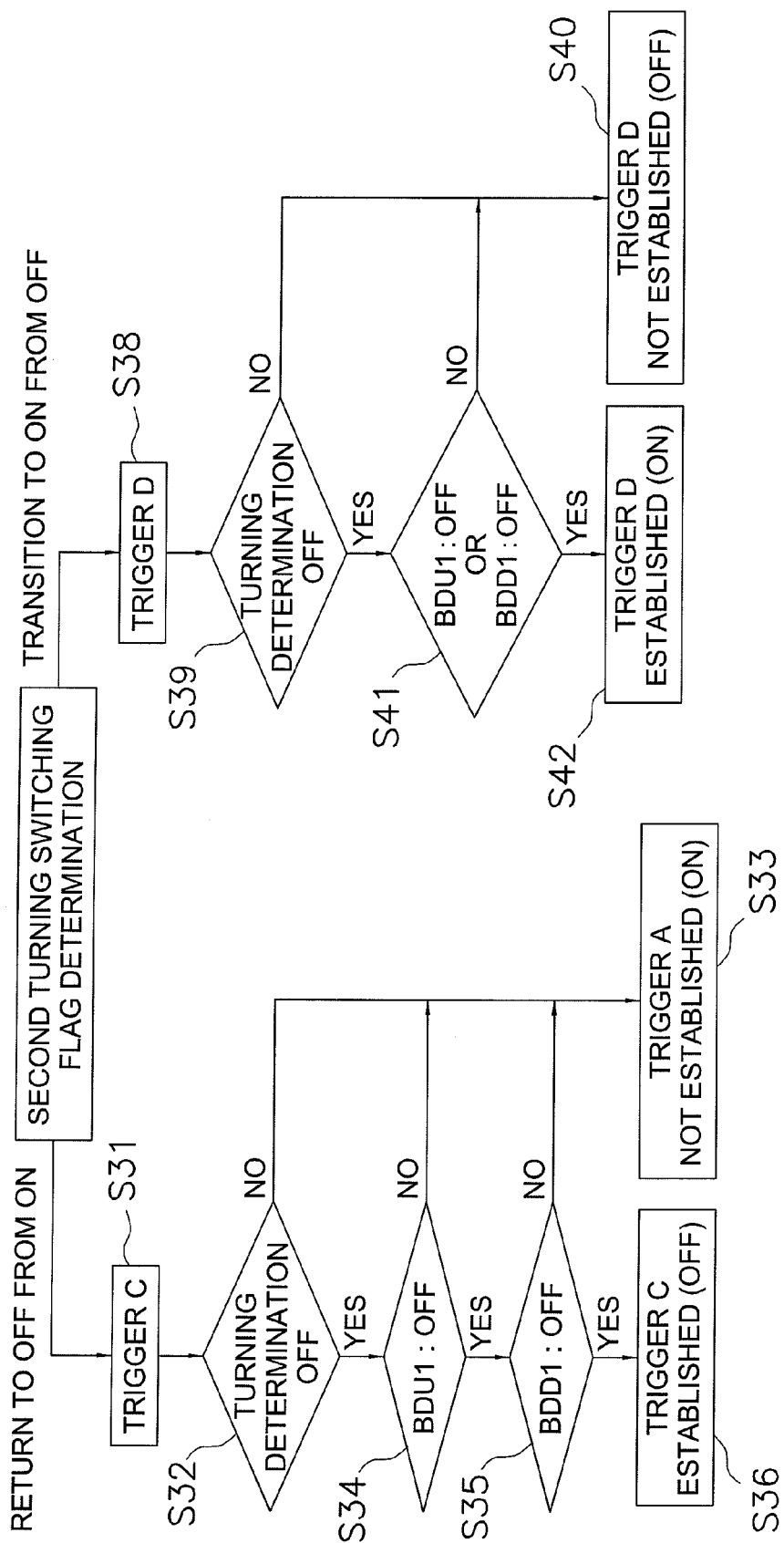
FIG. 11 is a flowchart of switching control for the merging/diverging valve.

In step S12, it is determined whether or not a second turning switching flag is "OFF". The second turning switching flag being ON/OFF is decided according to a flowchart shown in FIG. 11.

When determination whether or not the second turning switching flag has changed from "ON" to "OFF" is performed, determination of a trigger C starting from step S31 is carried out. When determination whether or not the second turning switching flag changes from "OFF" to "ON" is performed, determination of a trigger D starting from step S38 is started.

In the determination of trigger C, in step S32, it is determined whether or not the turning determination is "OFF". When the turning determination is not "OFF", in step S33, it is taken that the trigger C is not established, and the second turning switching flag remains "ON". In step S32, when the turning determination is "OFF", step S34 is proceeded to. In step S34, it is determined whether or not BDU1 is "OFF". When BDU1 is not "OFF", in step S33, trigger C is taken to not be established and the second turning switching flag is taken to remain "ON". When BDU1 is "OFF", step S35 is proceeded to. In step S35, it is determined whether or not BDD1 is "OFF". When BDD1 is not "OFF", in step S33, trigger C is taken to not be established and the second turning switching flag is taken to remain "ON". When BDD1 is "OFF", in step S36, the trigger C is taken to be established, and the second turning switching flag is changed to "OFF".

In the determination of trigger D, in step S39, it is determined whether or not the turning determination is "OFF". When the turning determination is not "OFF", in step S40, it is taken that the trigger D is not established, and the second turning switching flag remains "OFF". In step S39, when the turning determination is "OFF", step S41 is proceeded to. In step S41, it is determined whether or not BDU1 is "OFF", or whether or not BDD1 is "OFF". When one of these two conditions is satisfied, in step S42, the trigger D is taken to be established and the second turning switching flag is put "ON". In step S41, when none of the two conditions are satisfied in step S41, it is taken that the trigger D is not established in step S40 and the second turning switching flag remains "OFF".

Returning to FIG. 9, in step S12, when the second turning switching flag is "OFF", step S13 is proceeded to and the merging/diverging valve 23 is taken to be in the diverging state 64. When the second turning switching flag is not "OFF", step S14 is proceeded to and the merging/diverging valve 23 is taken to be in the merging state 63.

State of Merging/Diverging Valve 23 Every Running State

The controller 66 is capable of switching over the merging/diverging valve 23 according to changes in the running state by determining switching of the merging/diverging valve 23 using the control flow described above. A table collectively showing the states of the merging/diverging valve 23 every running state is shown in FIG. 12. In FIG. 12, in a first running state to an eleventh running state, the working equipment with the exception of the blade 5 (the boom 4, arm 10, and bucket 12 etc.) are in a stationary state of not being driven.

First Running State: When the hydraulic traveling vehicle 1 is stationary and the blade 5 is not operating, the merging/diverging valve 23 is taken to be in the merging state 63. A state in which the blade 5 is not being driven means that the blade 5 is being neither raised or lowered in the identification of the operating state of the blade 5 described above.

Second Running State: When the hydraulic traveling vehicle 1 is stationary and the blade 5 in a high-output state, the merging/diverging valve 23 is taken to be in the merging state 63. As a result, it is possible to supply sufficient pressurized oil to the blade 5 and it is possible to prevent output for being insufficient for the blade 5. The blade 5 being in a high-output state means that the operations of raising and lowering the blade 5 are carried out using a high-output with, for example, BDU2 explained above being "ON".

Third Running State: When the hydraulic traveling vehicle 1 is stationary and the blade 5 in a low-output state, the merging/diverging valve 23 is taken to be in the merging state 63. As a result, it is possible to supply sufficient pressurized oil to the blade 5. This means that when the blade 5 is in a low output state, in the identification of the operating state of the blade 5 described above, the blade 5 is being raised or lowered but not at a high-output state. This means that, for example, BDU1 is "ON" but BDU2 is "OFF".

Fourth Running State: When traveling in a straight line is taking place and the blade 5 is not operating, the merging/diverging valve 23 is taken to be in the diverging state 64. As a result, it is possible to split the pressurized oil approximately evenly between the right-travel motor 18 and the left-travel motor 19 and it is possible to improve directivity.

Fifth Running State: When traveling in a straight line is taking place and the blade 5 is in a high-output state, the merging/diverging valve 23 is taken to be in the merging state 63. As a result, it is possible to supply sufficient pressurized oil to the blade 5. Further, it is possible to reduce bias of pressurized oil supplied to the right-travel motor 18 and the left-travel motor 19 and it is possible to improve directivity.

Sixth Running State: When traveling in a straight line is taking place and the blade 5 is in a low-output state, the merging/diverging valve 23 is taken to be in the merging state 63. As a result, it is possible to supply sufficient pressurized oil to the blade 5. Further, it is possible to reduce bias of pressurized oil supplied to the right-travel motor 18 and the left-travel motor 19.

Seventh Running State: When sharp turning is taking place and the blade 5 is not being driven, the merging/diverging valve 23 is taken to be in the merging state 63. As a result, it is possible to supply sufficient pressurized oil to one of the travel motors and it is possible to improve turning speed.

Eighth Running State: When sharp turning is taking place and the blade 5 is being driven, the merging/diverging valve 23 is taken to be in the merging state 63. As a result, it is possible to supply sufficient pressurized oil to the blade 5, it is possible to supply sufficient pressurized oil to one of the travel motors, and it is possible to raise the turning travel speed. Here, the blade 5 can be in either a high-output state or a low-output state.

Ninth Running State: When gentle turning is taking place and the blade 5 is in a high-output state, the merging/diverging valve 23 is taken to be in the merging state 63. As a result, it is possible to reduce bias of pressurized oil supplied to the right-travel motor 18 and the left-travel motor 19 and it is possible to prevent the occurrence of under-turning or over-turning.

Tenth Running State: When gentle turning is taking place and the blade 5 is not being driven, the merging/diverging valve 23 is normally taken to be in the diverging state 64. In this case, it is possible to suppress loss of oil pressure by reducing pressurized oil supplied to one of the travel motors at the hydraulic pump 17. When the tenth running state is gone to from the ninth running state, the merging/diverging valve 23 does not adopt the diverging state 64 but rather maintains the merging state 63. When the fourth running state is then subsequently gone to, the merging/diverging valve 23 adopts the diverging state 64. Namely, when the blade operation lever 57 is returned to a neutral position from a state of gentle turning with the blade 5 being at high-output while maintaining gentle turning so as to make the blade 5 stationary, the merging/diverging valve 23 continues to merge rather than being put into the diverging state 64. As a result, switching from merging to diverting during gentle turning is prohibited and it is possible to prevent shocks from occurring in accompaniment with switching. Namely, when switching takes place between diverging and merging during gentle turning, there is the fear that the rotational speed of the travel motor(s) may change dramatically so as to cause a shock. It is therefore possible to prevent the occurrence of this kind of shock by inhibiting switching from merging to diverging during gentle turning.

Eleventh Running State: When gentle turning is taking place and the blade 5 is in a low-output state, the merging/diverging valve 23 is taken to be in the diverging state 64. In this case, it is possible to suppress loss of oil pressure by reducing pressurized oil supplied to one of the travel motors at the hydraulic pump 17. Further, the flow rate required for the blade cylinder 16 is small because the blade 5 is at low output. The fear of insufficient pressurized oil going to the blade cylinder 16 is therefore reduced. When the eleventh running state is gone to from the sixth running state, the merging/diverging valve 23 does not adopt the diverging state 64 but rather maintains the merging state. When the eleventh running state is gone to from the third running state, the merging/diverging valve 23 does not adopt the diverging state 64 but rather maintains the merging state. As a result, switching over from merging to diverging does not take place, and shocks accompanying changing over are prevented from occurring.

Twelfth Running State: When the working equipment is being driven with the exception of the blade 5, the merging/diverging valve 23 adopts the merging state 63 regardless of the running state and the driving state of the blade 5. As a result, it is possible to supply sufficient pressurized oil to the boom 4.

(1) It is possible to switch over between sharp turning where the merging/diverging valve 23 adopts the merging state 63 and gentle turning where the merging/diverging valve 23 adopts the diverging state 64 at the hydraulic traveling vehicle 1. This means that it is possible to turn without lowering the turning speed during sharp turning and it is possible to reduce loss of oil pressure during gentle turning.

Figure 13:
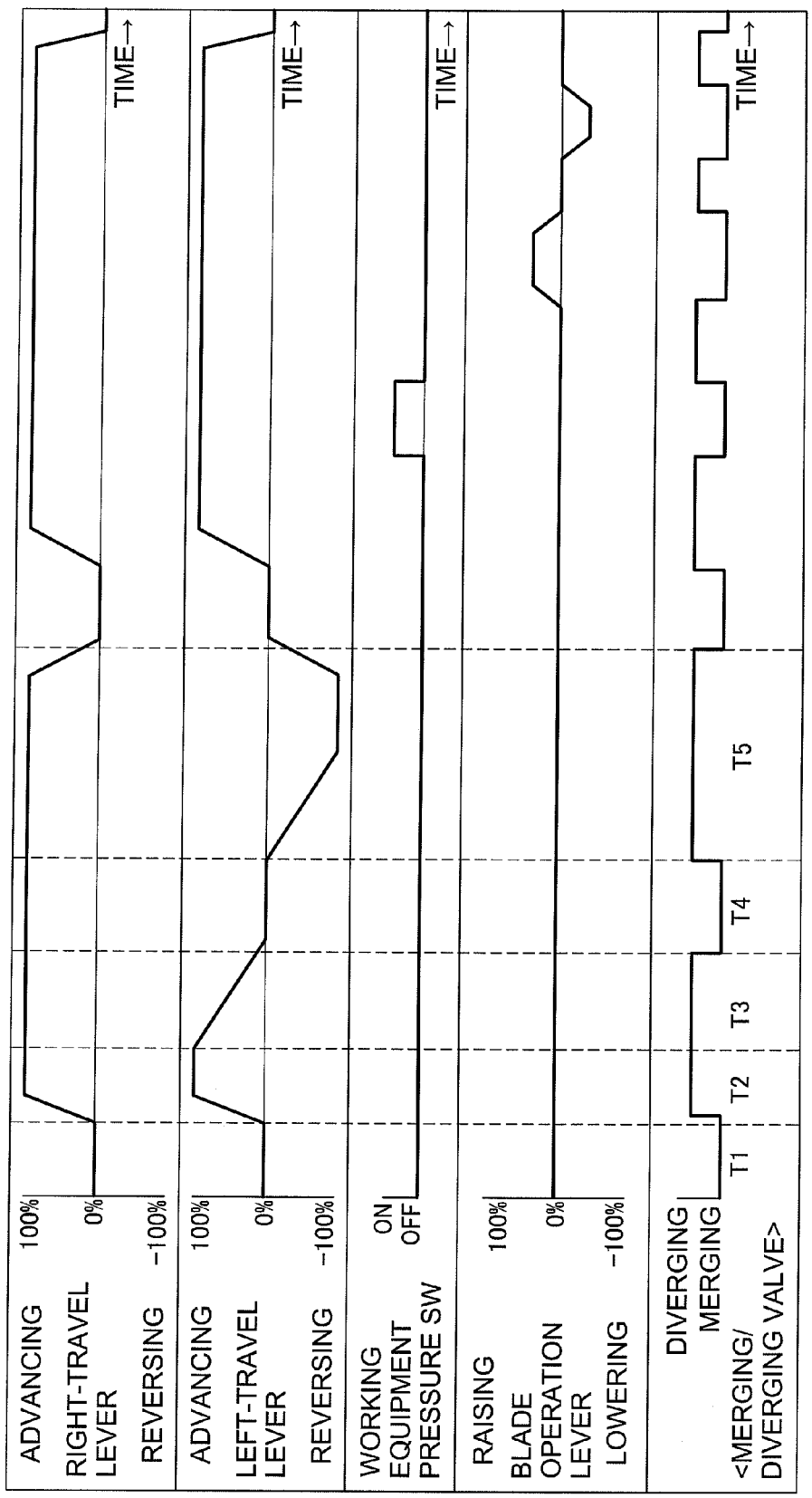
FIG. 13 is a timing chart showing switching of the merging/diverging valve as a result of change of running state.

For example, as shown in the time chart of FIG. 13, when the working equipment is not being driven and the hydraulic traveling vehicle 1 is in a stationary state, the merging/diverging valve 23 is in the merging state 63 (T1). When a completely open state where the right-travel lever 34 and the left-travel lever 42 are in a forward direction is gone to from this state, the hydraulic traveling vehicle 1 travels in a straight line and the merging/diverging valve 23 is switched over to diverging (T2). Next, when the left-travel lever 42 is returned slightly, the hydraulic traveling vehicle 1 performs gentle turning, and the merging/diverging valve 23 maintains divergence (T3). When the left-travel lever 42 is then returned to the neutral position, the hydraulic traveling vehicle 1 performs sharp turning and the merging/diverging valve 23 is switched over to merging (T4).

When the left-travel lever 42 is operated in a reverse direction in the above state, the hydraulic traveling vehicle 1 performs extremely sharp turning at an acuter angle than for the sharp turning. In this case, the merging/diverging valve 23 is put to diverging (T5).

(2) At the hydraulic traveling vehicle 1, when the blade 5 is switched over from being stationary to a high-output state in a state where the merging/diverging valve 23 adopts the diverging state 64 and gentle turning is carried out, the merging/diverging valve 23 is switched over from the diverging state 64 to the merging state 63 (i.e. in a case of switching over from the tenth running state to the ninth running state). However, when the blade 5 is switched over from a stationary state to a low-output state, the diverging state 64 is maintained without the merging/diverging valve 23 switching over to the merging state 63 (i.e. in a case of switching over from the tenth running state to the eleventh running state).

Figure 14:
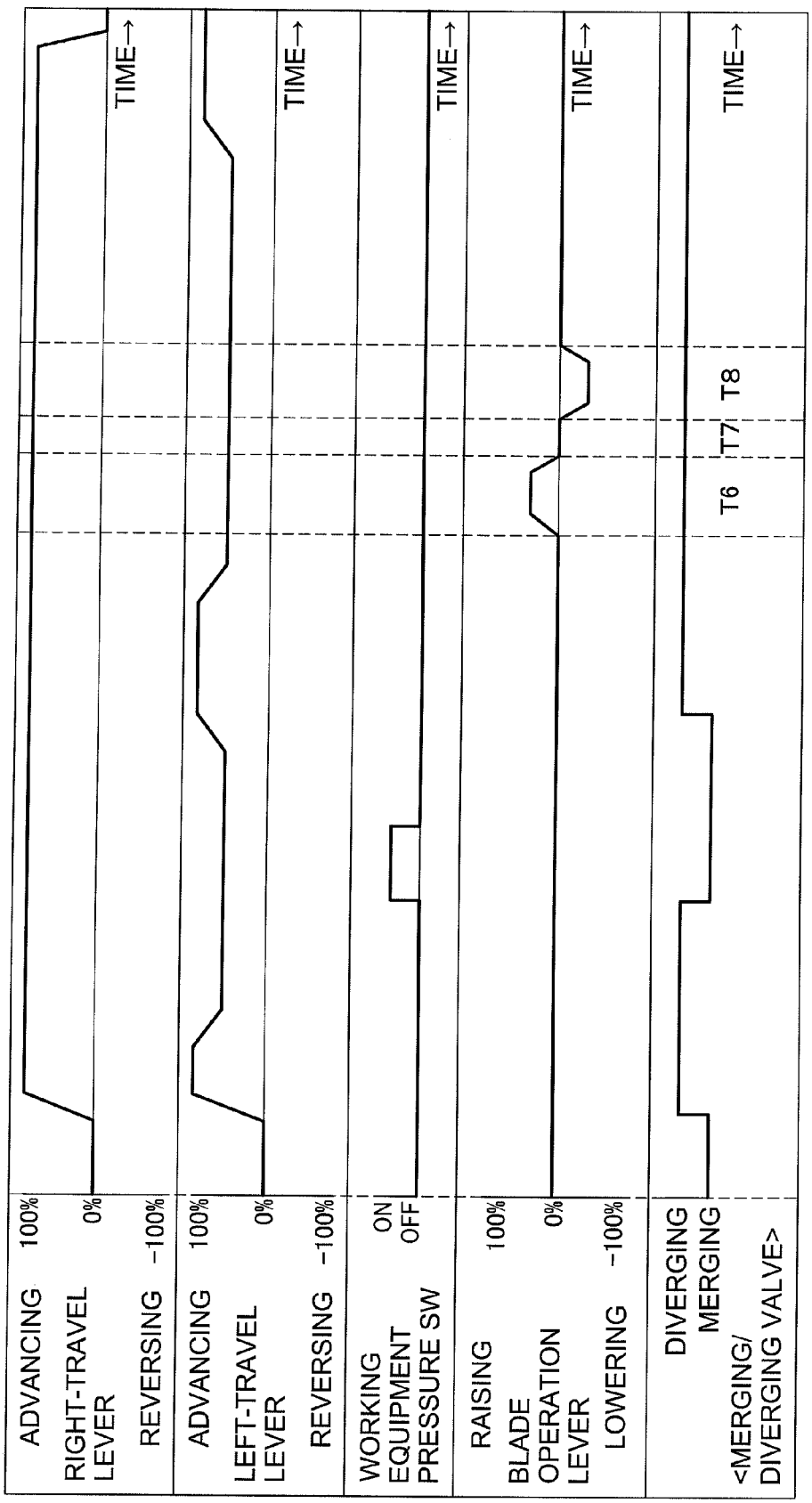
FIG. 14 is timing chart showing switching of the merging/diverging valve as a result of change of running state.

For example, in the time chart of FIG. 14, during gentle turning, the merging/diverging valve 23 maintains the diverging state 64 in any of a case where the blade operation lever 57 is operated slightly in a raising operation direction (T6), a case where the blade operation lever 57 is returned to a neutral position (T7), or a case where the blade operation lever 57 is operated slightly in a lowering operation direction (T8).

In this way, by putting the merging/diverging valve 23 in the merging state 63 when the extent of operation of the blade operation lever 57 is sufficiently large in a high-output state where the necessity to supply sufficient pressurized oil to the blade 5 is high, sufficient pressurized oil can be supplied to the blade 5. It is also possible to reduce bias of pressurized oil supplied to the right-travel motor 18 and the left-travel motor 19 and to prevent under-turning and over-turning. With regards to this, when the extent of operation of the blade operation lever 57 is small and a low-output state is adopted where the quantity of pressurized oil supplied to the blade 5 is small, it is possible for the frequency of the switching from the diverging state 64 to the merging state 63 during gentle turning to be reduced by maintaining the merging/diverging valve 23 in the diverging state 64 without going to the merging state 63 even when the blade 5 is being driven. It is therefore also possible to reduce the occurrence of shocks during gentle turning.

It is not necessary to provide an independent fixing pump for the blade 5 in order to reduce shock. It is therefore possible to improve fuel consumption without engine horsepower being consumed by a fixing pump. Further, it is also possible to improve space efficiency as compared with a case where a fixing pump is provided.

When gentle turning is switched over to from traveling in a straight line when the blade 5 is being driven at low output and the merging/diverging valve 23 is in the merging state 63 (i.e. in the case of switching over from the sixth running state to the eleventh running state), the merging/diverging valve 23 maintains the merging state 63. In this event, the merging/diverging valve 23 is originally in the merging state 63 and can therefore be kept in the merging state 63 without switching over to the diverging state 64. As a result, it is possible to prevent the occurrence of shocks due to switching over from merging to diverging.

In the case of switching over from a stationary state to gentle turning when the blade 5 is being driven at low output and the merging/diverging valve 23 is in the merging state 63 (i.e. in the case of switching over from the third running state to the eleventh running state), the merging/diverging valve 23 is maintained at the merging state 63. In this event also, the merging/diverging valve 23 is originally in the merging state 63 and can therefore be kept in the merging state 63 without switching over to the diverging state 64. As a result, it is possible to prevent the occurrence of shocks due to switching over from merging to diverging while starting to drive the blade 5.

(3) At the hydraulic traveling vehicle 1, in the state where the working equipment is not driven and gentle turning is taking place, the merging/diverging valve 23 is normally in the diverging state 64 (tenth running state). However, when the blade 5 is stopped from a state (ninth running state) where gentle turning is taking place, the blade 5 is being driven, and the merging/diverging valve 23 is in the merging state 63, gentle turning takes place without the working equipment being driven. However, while the gentle turning is maintained, the merging/diverging valve 23 is maintained in the merging state 63, and when switching over from gentle turning to traveling in a straight line, the merging/diverging valve 23 is switched to the diverging state 64. Namely, the merging/diverging valve 23 is maintained in the merging state 63 even if the blade operation lever 57 is returned to a neutral position from a completely open position during gentle turning. After then, when switching over from gentle turning to traveling in a straight line, the merging/diverging valve 23 is switched to the diverging state 64. As a result, it is possible to prevent the occurrence of shocks due to switching over from merging to diverging while halting the blade 5 during gentle turning.

Figure 15:
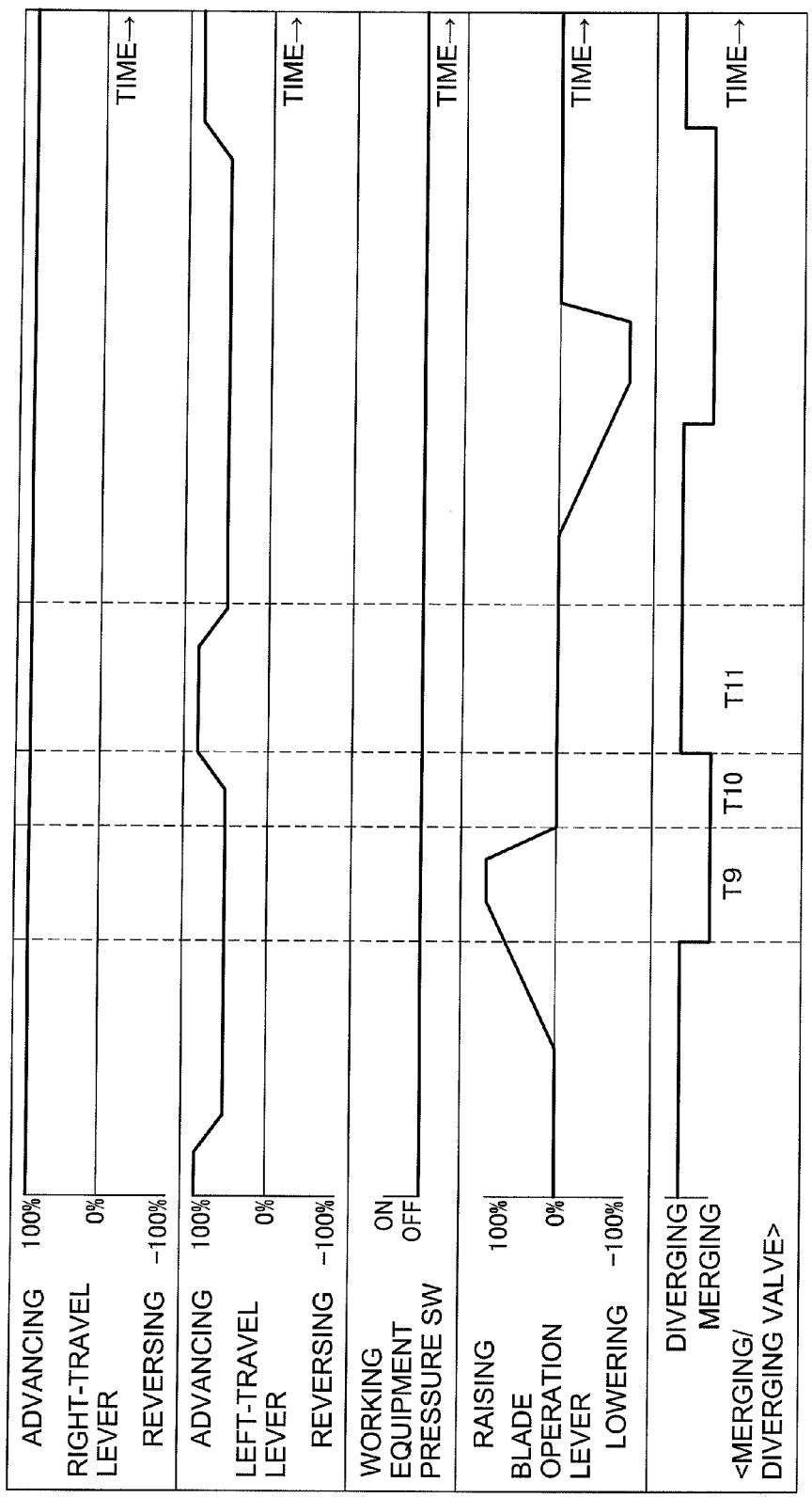
FIG. 15 is timing chart showing switching of the merging/diverging valve as a result of change of running state.

For example, with the time chart of FIG. 15, the merging/diverging valve 23 is in the merging state 63 when the blade operation lever 57 is completely open during gentle turning (T9). The merging/diverging valve 23 is maintained in the merging state 63 even if the blade operation lever 57 is returned to the neutral position with the gentle turning being maintained. The merging/diverging valve 23 is switched over to the diverging state 64 by switching over to traveling in a straight line by putting the left-travel lever 42 in a completely open position as with the right-travel lever 34.

OTHER EMBODIMENTS (A) In the above embodiment, the pilot pressures for the right-travel valve 27, the left-travel valve 35, the blade valve 51, and the boom valve 43 etc. are detected as required flow rate parameters corresponding to the required flow rate for the pressurized oil for the travel motors 18, 19 and the working equipment. However, it is also possible to use other means of detection corresponding to the required flow rate for the right-travel motor 18, the left-travel motor 19, the blade cylinder 16, and the boom cylinder 9 etc. For example, position sensors for detecting the operation positions of the right-travel lever 34, the left-travel lever 42, the blade operation lever 57, and the boom operation lever 50 can be provided with the traveling state and operating state of the working equipment then being identified based on the signals from the position sensors. However, detection of pilot pressure is preferable from the point of view of improving precision of identification of the traveling state and the operating state of the working equipment. For example, in the case of the position sensor, if the travel lever is in a completely open position or a intermediate position, even when the engine has stopped, there is the fear that a traveling state may be erroneously determined. However, if the pilot pressure is detected, the pilot pressure is not detected when the engine is stopped and there is therefore little fear of this kind of erroneous determination.

(B) In the above embodiment, when the blade 5 is stopped in a state where gentle turning is taking place and the blade 5 is at high-output, the merging/diverging valve 23 is made to remain in the merging state 63 and is not put into the diverging state 64. Control can also be similarly carried out for the case of stopping the working equipment (for example, boom 4) with the exception of the blade 5, rather than being carried out for the blade 5. The merging/diverging valve 23 also adopts the merging state 63 when gentle turning is taking place and the working equipment is being driven with the exception of the blade 5 (refer to running state 12 of FIG. 12). It is therefore also possible to suppress shocks by also maintaining the merging state 63 when the working equipment is stationary with the exception of the blade 5.

(C) In the above embodiment, the hydraulic pump 17 is a double pump where one pump body has two discharge openings but a tandem pump where two hydraulic pumps provided with one discharge opening at one pump body are incorporated in tandem can also be used as the hydraulic pump 17.

(D) In the above embodiment, levers such as the right-travel lever 34 and the left-travel lever 42 are used but the present invention is not limited to levers, and other operation members such as pedals can also be provided.

(E) In the above embodiment, an example is cited of a hydraulic shovel as the hydraulic traveling vehicle 1 but the present invention is also applicable to other hydraulic traveling vehicles 1 such as crawler dumpers.

(F) In the above embodiment, the controller 66 can be used as a travel switching unit and the merging/diverging valve 23 can then be switched over by the controller 66 controlling the merging/diverging pilot valve 65 electrically. However, a merging/diverging valve switching mechanism that receives the pilot pressures and switches over the merging/diverging valve 23 mechanically can also be provided as the travel switching unit.

(G) In the above embodiment, when the blade 5 is driven at low output with the merging/diverging valve 23 in the diverging state 64 and with gentle turning being carried out, the merging/diverging valve 23 maintained in the diverging state 64 without being switched over to the merging state 63 (eleventh running state). However, from the point of view of lower shock due to switching of the merging/diverging valve 23 during turning, the invention is not limited to during gentle turning and switching control can also be similarly carried out during sharp turning. For example, although not disclosed in the above embodiment, if the blade 5 is not driven, sharp turning is carried out, and the merging/diverging valve 23 is in the diverging state 64, the merging/diverging valve 23 maintains the diverging state 64 without switching to the merging state 63 even when the blade 5 is at low output during sharp turning. As a result, shocks due to switching of the merging/diverging valve 23 during sharp turning can be reduced.

With the hydraulic traveling vehicle of the present invention, the merging/diverging valve is switched over to the merging state when the required flow rate parameter is the prescribed threshold value or more, when the working equipment is driven with the merging/diverging valve in the diverging state and with turning being performed. As a result, it is possible to ensure pressurized oil is supplied to the working equipment, it is possible to suppress falls in the rotational speed of travel motors included in the same hydraulic circuit as the working equipment, and it is possible to suppress over-turning and under-turning. The merging/diverging valve is also maintained in the diverging state when the required flow rate parameter is lower than the prescribed threshold value. As a result, the frequency of switching over from the diverging state to the merging state during turning is reduced, and the occurrence of shocks when the working equipment is driven during turning is suppressed. Further, in this event, the required flow rate for pressurized oil for the working equipment is low. There is therefore no fear of supply of pressurized oil to the working equipment being insufficient or of the rotational speed of travel motors included in the same hydraulic circuit as the working equipment falling.

The invention claimed is:

1. A hydraulic traveling vehicle comprising:
   a right-travel motor arranged in a first hydraulic circuit to be driven by pressurized oil;
   a left-travel motor arranged in a second hydraulic circuit to be driven by pressurized oil;
   a working equipment arranged in one of the first hydraulic circuit and the second hydraulic circuit to be driven by pressurized oil;
   a hydraulic pump having a first hydraulic oil supply unit configured and arranged to supply the pressurized oil to the first hydraulic circuit and a second hydraulic oil supply unit configured and arranged to supply the pressurized oil to the second hydraulic circuit;
   a merging/diverging valve configured and arranged to switch between a merging state to merge the first hydraulic circuit and the second hydraulic circuit and a diverging state to separate the first hydraulic circuit and the second hydraulic circuit; and
   a control unit configured to control the merging/diverging valve when the working equipment is driven, the merging/diverging valve is in the diverging state, and the hydraulic traveling vehicle is traveling in a turning condition, such that
      the merging/diverging valve is switched to the merging state when a required flow rate parameter corresponding to a required flow rate for the pressurized oil of the working equipment is greater than or equal to a prescribed threshold value, and
      the merging/diverging valve is maintained in the diverging state when the required flow rate parameter is lower than the prescribed threshold value.

2. The hydraulic traveling vehicle according to claim 1, wherein
   the control unit is further configured to control the merging/diverging valve to be maintained in the merging state regardless of the required flow rate parameter when the hydraulic traveling vehicle is switched from a straight line traveling condition to the turning condition with the working equipment being driven and the merging/diverging valve being in the merging state.

3. The hydraulic traveling vehicle according to claim 1, wherein
the control unit is further configured to control the merging/diverging valve to be maintained in the merging state regardless of the required flow rate parameter when the hydraulic traveling vehicle is switched from a stationary state to the turning condition with the working equipment being driven and the merging/diverging valve being in the merging state.

4. The hydraulic traveling vehicle according to claim 1, further comprising
a working equipment valve configured and arranged to regulate the pressurized oil supplied to the working equipment,
a working equipment operation unit configured and arranged to regulate pilot pressure supplied to the working equipment valve according to an operation amount of the working equipment, and
a pilot pressure detector configured and arranged to detect the pilot pressure supplied to the working equipment valve,
the control unit being configured to compare the pilot pressure detected by the pilot pressure detector as the required flow rate parameter with the prescribed threshold value.

5. A hydraulic traveling vehicle comprising:
a right-travel motor arranged in a first hydraulic circuit to be driven by pressurized oil;
a left-travel motor arranged in a second hydraulic circuit to be driven by pressurized oil;
a working equipment arranged in one of the first hydraulic circuit and the second hydraulic circuit to be driven by pressurized oil;
a hydraulic pump having a first hydraulic oil supply unit configured and arranged to supply the pressurized oil to the first hydraulic circuit and a second hydraulic oil supply unit configured and arranged to supply the pressurized oil to the second hydraulic circuit;
a merging/diverging valve configured and arranged to switch between a merging state to merge the first hydraulic circuit and the second hydraulic circuit and a diverging state to separate the first hydraulic circuit and the second hydraulic circuit; and
a control unit configured to control the merging/diverging valve when the working equipment is stopped from a state where the hydraulic traveling vehicle is in a turning condition, the working equipment is being driven, and the merging/diverging valve is in the merging state, such that
the merging/diverging valve is maintained in the merging state while the hydraulic traveling vehicle is maintained in the turning condition, and
the merging/diverging valve is switched to the diverging state when the hydraulic traveling vehicle is switched from the turning condition to a straight line traveling condition.

* * * * *